(12) United States Patent
Matsumoto et al.

(10) Patent No.: US 7,680,936 B2
(45) Date of Patent: Mar. 16, 2010

(54) IT RESOURCE MANAGEMENT SYSTEM, IT RESOURCE MANAGEMENT METHOD, AND IT RESOURCE MANAGEMENT PROGRAM

(75) Inventors: Yasuhide Matsumoto, Kawasaki (JP); Masatomo Yasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1006 days.

(21) Appl. No.: 11/190,969

(22) Filed: Jul. 28, 2005

(65) Prior Publication Data

US 2006/0224436 A1    Oct. 5, 2006

(30) Foreign Application Priority Data

Mar. 17, 2005    (JP)    ............... 2005-077699

(51) Int. Cl.
*G07G 1/00*    (2006.01)
*G06F 15/173*    (2006.01)

(52) U.S. Cl. .................. 709/226; 709/223; 705/1; 705/10; 705/400

(58) Field of Classification Search ................. 709/223, 709/226; 705/1, 10, 400
See application file for complete search history.

(56) References Cited

U.S. PATENT DOCUMENTS

| | | | | |
|---|---|---|---|---|
| 5,369,570 | A * | 11/1994 | Parad ............................. | 705/8 |
| 5,971,585 | A * | 10/1999 | Dangat et al. ................ | 700/102 |
| 6,094,680 | A * | 7/2000 | Hokanson .................... | 709/223 |
| 6,463,345 | B1 * | 10/2002 | Peachey-Kountz et al. .... | 700/99 |
| 6,757,730 | B1 * | 6/2004 | Lee et al. ..................... | 709/226 |
| 7,191,137 | B1 * | 3/2007 | Berlin et al. ................... | 705/1 |
| 7,305,278 | B2 * | 12/2007 | Enright et al. ................ | 700/115 |
| 7,308,416 | B2 * | 12/2007 | Peachey-Kountz et al. ..... | 705/8 |
| 7,349,880 | B1 * | 3/2008 | Kitao, Yoshitaka ........... | 705/37 |
| 7,349,965 | B1 * | 3/2008 | Graupner et al. ............. | 709/226 |
| 2001/0044788 | A1 * | 11/2001 | Demir et al. ................ | 705/400 |
| 2002/0091827 | A1 * | 7/2002 | King et al. .................... | 709/226 |
| 2002/0111916 | A1 * | 8/2002 | Coronna et al. ............... | 705/64 |
| 2003/0014524 | A1 * | 1/2003 | Tormasov .................... | 709/226 |
| 2003/0028642 | A1 * | 2/2003 | Agarwal et al. ............. | 709/226 |
| 2003/0069972 | A1 * | 4/2003 | Yoshimura et al. .......... | 709/226 |
| 2004/0111308 | A1 * | 6/2004 | Yakov ........................... | 705/8 |
| 2004/0111358 | A1 * | 6/2004 | Lange et al. .................. | 705/37 |
| 2004/0139038 | A1 * | 7/2004 | Ehlers et al. ................. | 705/412 |
| 2004/0162737 | A1 * | 8/2004 | Ikeda et al. .................... | 705/1 |
| 2004/0199667 | A1 * | 10/2004 | Dobbins ..................... | 709/240 |
| 2004/0221038 | A1 * | 11/2004 | Clarke et al. ................ | 709/226 |

(Continued)

FOREIGN PATENT DOCUMENTS

JP    2003124976    4/2003

*Primary Examiner*—Alina N. Boutah
(74) *Attorney, Agent, or Firm*—Westerman, Hattori, Daniels & Adrian, LLP

(57) ABSTRACT

An IT resource management system for managing a plurality of IT resources owned by a plurality of operating entities includes a supply condition accumulating part for accumulating a supply condition of a surplus IT resource, a demand condition accumulating part for accumulating a demand condition of an insufficient IT resource, a matching part for extracting a set of a supply condition and a demand condition matched with each other from the supply conditions and the demand conditions accumulated in the accumulating parts, and an assigning part for allowing an IT resource under the supply condition of the set to be available for an operating entity under the demand condition of the set.

9 Claims, 19 Drawing Sheets

U.S. PATENT DOCUMENTS

| | | | |
|---|---|---|---|
| 2005/0086335 A1* | 4/2005 | Liu et al. | 709/223 |
| 2005/0177380 A1* | 8/2005 | Pritchard et al. | 705/1 |
| 2005/0273341 A1* | 12/2005 | Hoffesommer | 705/1 |
| 2006/0100745 A1* | 5/2006 | Kallestad | 700/277 |
| 2006/0294238 A1* | 12/2006 | Naik et al. | 709/226 |
| 2007/0043478 A1* | 2/2007 | Ehlers et al. | 700/276 |

\* cited by examiner

```xml
<?xml version="1.0" encoding="UTF-8"?>
<ITResources xmlns:xsi="http://www.w3.org/2001/XMLSchema-instance"
   xsi:noNamespaceSchemaLocation="http://idc.f_company.com/it_resource.xsd">
  <ITResourceItem>
```

A:
```xml
<ConditionProfile>
  <SupplyDemand>Supply</SupplyDemand>
  <OtherInfo/>
</ConditionProfile>
```

B:
```xml
<BusinessPolicy>
```

B1:
```xml
<PriceType>
  <PriceItem>
    <PriceKey>CPU</PriceKey>
    <PriceValue>1000</PriceValue>
    <PriceEvaluator>uri://idc. f_company.com/PriceEvaluator</PriceEvaluator>
  </PriceItem>
</PriceType>
```

B2:
```xml
<ProcessType>
  <ProcessItem>
    <ProcessKey>Process</ProcessKey>
    <ProcessValue>Online</ProcessValue>
    <ProcessEvaluator>uri://idc. f_company.com/PriceEvaluator</ProcessEvaluator>
  </ProcessItem>
</ProcessType>
```

B3:
```xml
<ACL>
  <Allow>*.f_company.com</Allow>
  <Deny>*.h_company.com</Deny>
</ACL>
</BusinessPolicy>
```

C:
```xml
<ServicePolicy>
```

C1:
```xml
<PeriodType>
  <Period>
    <StartTime>2004/12/01</StartTime>
    <EndTime>2004/01/01</EndTime>
  </Period>
  <PeriodConditoin>
    <TimeItem>
      <TimeKey>From</TimeKey>
      <TimeValue>0:00</TimeValue>
      <TimeEvaluator>uri://idc. f_company.com/TimeEvaluator</TimeEvaluator>
    </TimeItem>
    <TimeItem>
      <TimeKey>To</TimeKey>
      <TimeValue>7:00</TimeValue>
      <TimeEvaluator>uri://idc. f_company.com/TimeEvaluator</TimeEvaluator>
    </TimeItem>
  </PeriodConditoin>
</PeriodType>
```

C2:
```xml
<ResourceCondition>
  <CondtionItem>
    <CondtionKey>CPU_cond</CondtionKey>
    <CondtionValue><10%</CondtionValue>
    <ConditionEvaluator>uri://idc. f_company.com/ConditionEvaluator</ConditionEvaluator>
  </CondtionItem>
  <CondtionItem>
    <CondtionKey>CPU</CondtionKey>
    <ConditionValue><50%</CondtionValue>
    <ConditionEvaluator>uri://idc. f_company.com/ConditionEvaluator</ConditionEvaluator>
  </CondtionItem>
</ResourceCondition>
</ServicePolicy>
```

```xml
  </ITResourceItem>
</ITResources>
```

```xml
<?xml version="1.0" encoding="UTF-8"?>
<ITResources xmlns:xsi="http://www.w3.org/2001/XMLSchema-instance"
xsi:noNamespaceSchemaLocation="http://idc.f_company.com/it_resource.xsd">
```

A {
```xml
<ITResourceItem>
  <ConditionProfile>
    <SupplyDemand>Demand</SupplyDemand>
    <OtherInfo/>
  </ConditionProfile>
```

B {
```xml
<BusinessPolicy>
  <PriceType>
    <PriceItem>
      <PriceKey>CPU</PriceKey>
      <PriceValue>1000</PriceValue>
      <PriceEvaluator>uri://idc.f_company.com/PriceEvaluator</PriceEvaluator>
    </PriceItem>
  </PriceType>
  <ProcessType>
    <ProcessItem>
      <ProcessKey>Process</ProcessKey>
      <ProcessValue>Online</ProcessValue>
      <ProcessEvaluator>uri://idc.f_co.com/ProcessEvaluator</ProcessEvaluator>
    </ProcessItem>
  </ProcessType>
  <ACL>
    <Allow>*.f_company.com</Allow>
    <Deny>*.h_company.com</Deny>
  </ACL>
</BusinessPolicy>
```

22:

```xml
<?xml version="1.0" encoding="UTF-8"?>
<ITResources xmlns:xsi="http://www.w3.org/2001/XMLSchema-instance"
xsi:noNamespaceSchemaLocation="http://idc.f_company.com/it_resource.xsd">
<ITResourceItem>
  <ConditionProfile>
    <SupplyDemand>Supply</SupplyDemand>
    <OtherInfo/>
  </ConditionProfile>
```

B1 {
```xml
<BusinessPolicy>
  <PriceType>
    <PriceItem>
      <PriceKey>CPU</PriceKey>
      <PriceValue>1000</PriceValue>
      <PriceEvaluator>uri://idc.f_company.com/PriceEvaluator</PriceEvaluator>
    </PriceItem>
  </PriceType>
```

B2 {
```xml
  <ProcessType>
    <ProcessItem>
      <ProcessKey>Process</ProcessKey>
      <ProcessValue>Online</ProcessValue>
      <ProcessEvaluator>uri://idc.f_co.com/ProcessEvaluator</ProcessEvaluator>
    </ProcessItem>
  </ProcessType>
```

B3 {
```xml
  <ACL>
    <Allow>*.f_company.com</Allow>
    <Deny>*.h_company.com</Deny>
  </ACL>
</BusinessPolicy>
```

IT RESOURCE MANAGEMENT SYSTEM, IT RESOURCE MANAGEMENT METHOD, AND IT RESOURCE MANAGEMENT PROGRAM

BACKGROUND OF THE INVENTION

1. Field of the Invention

The present invention relates to an IT resource management system for managing IT resources owned by a plurality of operating entities, for example, as in an Internet data center (hereinafter, referred to as an "IDC").

2. Description of Related Art

Regarding an information technology (IT) system forming the foundation of the economy and society, there is a requirement for stability, robustness, and economic efficiency. In recent years, in order to maintain the function of an IT system that is being sophisticated more and more in response to the change in an administration environment while keeping stability and robustness, the technique of autonomous processing of the system is becoming indispensable. The autonomous processing refers to that a system takes over a part of determination, which has been conducted by human beings. The autonomous processing enhances the ability of the system to respond to a load increase, a failure, and the like, and the adjustability of the system with respect to the change in a business environment.

For example, in the IDC, there is a requirement for an autonomous control for the optimum use of an IT resource. The IDC is a facility for taking care of an IT resource of a server of a customer, a storage, a network, and the like, and supplies a connection line to the Internet, maintenance operation service, and the like. FIG. 18 is a schematic view showing a system configuration of a general IDC. In the IDC, the operations of IT resources 91, 92, and 93 of a plurality of corporations A, B, and C that are customers are managed. The owners of the plurality of IT resources 91, 92, and 93 that are managed in the IDC are individual corporations A, B, and C, respectively.

In particular, the IDC capable of increasing/decreasing an IT resource assigned for each corporation in accordance with needs on demand is called an IDC of a utility system. By setting the IDC to be of a utility system, an IT resource of each customer can be used efficiently in accordance with a changing business environment.

Setting the IDC to be of a utility system has been studied on the precondition that an IT resource owned by each corporation that is a customer of an IDC is used. Therefore, the technical study has been mainly conducted on the precondition of the direct use of an IT resource between the individual corporation and the IDC.

FIG. 19 is a schematic view showing a system configuration of an IDC of a utility system. An IDC managing part 94 manages the operation by monitoring IT resources 96, 97 of corporations D, E that are customers. For example, upon detecting the state where the IT resource 96 of the corporation D is insufficient, the IDC managing part 94 lends an IT resource corresponding to the shortage from a server pool 95 that is an IT resource of the IDC to the corporation D. Therefore, it is necessary that sufficient IT resources should be prepared in the server pool 95. On the other hand, for example, even in the case where the IT resource 97 of the corporation E is in excess, since the corporation E owns the IT resource 97, the IDC managing part 94 cannot use the surplus of the IT resource 97. More specifically, there arises a situation in which an IT resource is not used effectively.

On the other hand, for example, as disclosed by JP 2003-124976A, a method for effectively using an IT resource in the IDC has been proposed. According to this method, when the load of a user varies in a data center, the assignment of a resource with respect to the user is dynamically changed in accordance with the load.

SUMMARY OF THE INVENTION

However, according to the above-mentioned conventional method, the assignment for an insufficient IT resource is merely conducted directly by the IDC, and the interchange of IT resources between corporations that are customers is not considered. More specifically, there is no mechanism for distributing a surplus of an IT resource in each corporation among corporations. Therefore, in the conventional IDC, the IT resources of all the corporations are not always used 100%, so that a surplus IT resource is present. Therefore, there is a problem that an IT resource is not used efficiently.

Therefore, with the foregoing in mind, it is an object of the present invention to provide an IT resource management system, an IT resource management method, and an IT resource management program capable of efficiently using IT resources owned by a plurality of operating entities.

An IT resource management system of the present invention for managing a plurality of IT resources owned by a plurality of operating entities: a supply condition accumulating part for accumulating a supply condition of an IT resource input by an operating entity that desires to supply a surplus IT resource; a demand condition accumulating part for accumulating a demand condition of an IT resource input by an operating entity that desires to compensate for a shortage of an IT resource; a matching part for extracting a set of a supply condition and a demand condition matched with each other from the supply conditions accumulated in the supply condition accumulating part and the demand conditions accumulated in the demand condition accumulating part; and an assigning part for allowing an IT resource under the supply condition of the set to be available for the operating entity under the demand condition of the set.

The matching part extracts a set of a supply condition and a demand condition matched with each other from the supply condition accumulating part in which the supply condition for supplying a surplus IT resource is accumulated and the demand condition accumulating part in which the demand condition for compensating for an insufficient IT resource is accumulated. The assigning part allows an IT resource under the extracted supply condition to be available for the operating entity that has presented the extracted demand condition. More specifically, the assigning part lends a surplus IT resource to the operating entity that is short of an IT resource. Consequently, by using a surplus IT resource in a certain operating entity, the shortage of an IT resource of another operating entity can be compensated. Thus, the surplus of an IT resource in each operating entity is distributed among operating entities, whereby IT resources owned by a plurality of operating entities can be used efficiently.

According to an IT resource management method of the present invention for managing a plurality of IT resources owned by a plurality of operating entities by a computer, in a configuration in which the computer is capable of accessing a recording apparatus storing a supply condition of an IT resource input by an operating entity that desires to supply a surplus IT resource, and a demand condition of an IT resource input by an operating entity that desires to compensate for a shortage of an IT resource, the method includes: a matching operation for the computer to extract a set of a supply condition and a demand condition matched with each other from the supply conditions and the demand conditions stored in the recording apparatus; and an assigning operation for the computer to change a setting of an IT resource under the supply condition of the set, in such a manner that the IT resource under the supply condition of the set is available for the operating entity under the demand condition of the set.

A recording medium of the present invention stores an IT resource management program for allowing a computer to execute processing of managing a plurality of IT resources owned by a plurality of operating entities. The IT resource management program allows the computer to execute: matching processing of extracting a set of a supply condition and a demand condition matched with each other from a supply condition of an IT resource input by an operating entity that desires to supply a surplus IT resource and a demand condition of an IT resource input by an operating entity that desires to compensate for a shortage of an IT resource; and assigning processing of allowing an IT resource under the supply condition of the set to be available for the operating entity under the demand condition of the set.

The "IT resource" refers to hardware and/or software for implementing a system. Examples of the IT resource include a server, middleware, a network, a storage, various kinds of terminals (a personal computer, a PDA, a mobile telephone, etc.), and a RFID tag.

According to the present invention, an IT resource management system, an IT resource management method, and an IT resource management program, capable of efficiently using IT resources owned by a plurality of operating entities, can be provided.

BRIEF DESCRIPTION OF THE DRAWINGS

FIG. 6 is a view showing an example of specific data representing demand conditions.

FIG. 9 shows an example of the case where the business policy of the demand condition is matched with that of the supply condition.

DETAILED DESCRIPTION OF THE INVENTION

Figure 1:
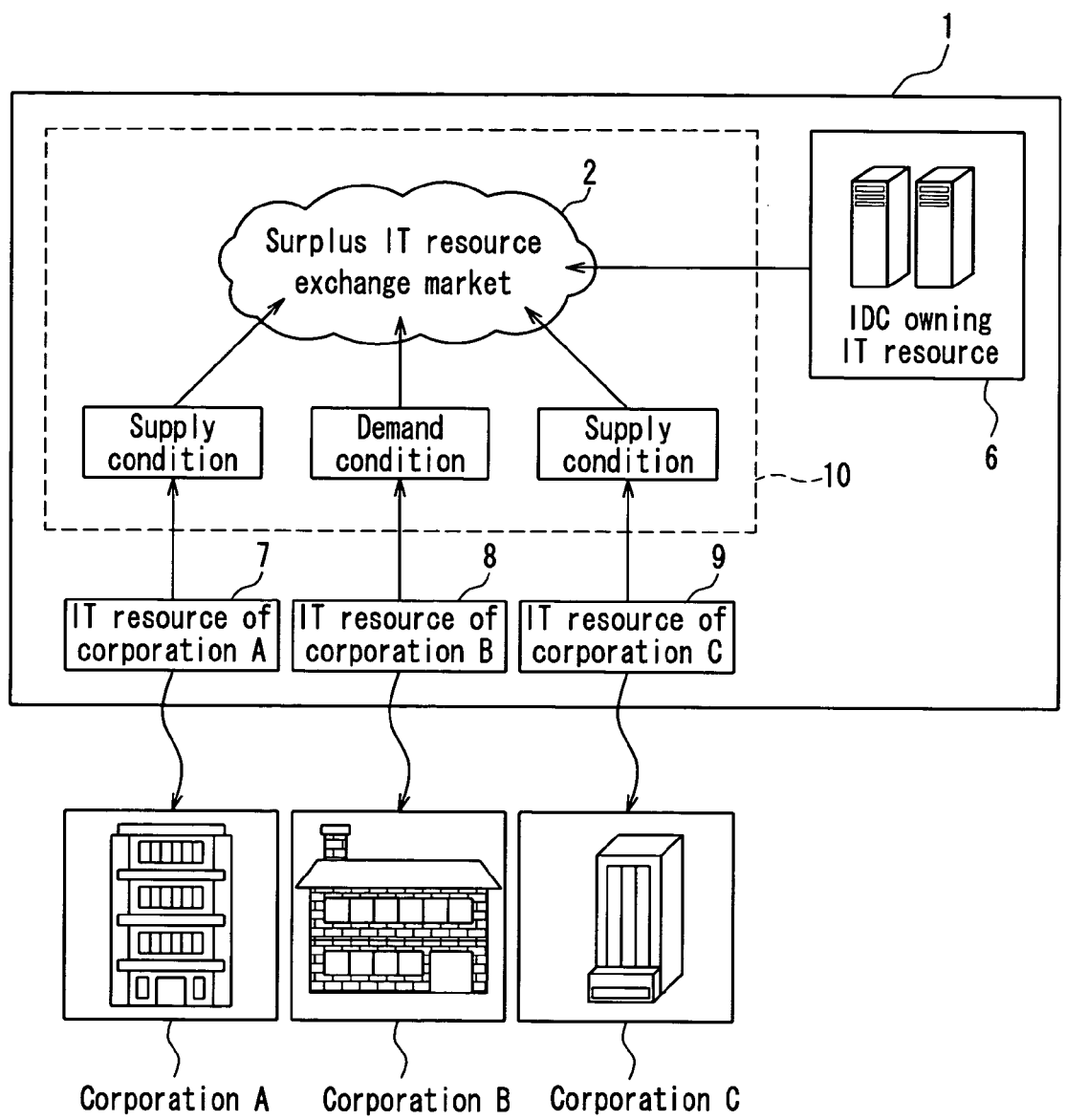
FIG. 1 is a conceptual diagram showing the concept of an entire configuration of an IDC.

In the IT resource management system of the present invention, it is preferable that the assigning part adds a previously prepared IT resource to an IT resource under the demand condition of the set, in a case where the IT resource under the supply condition of the set is insufficient for the demand condition of the set.

Even in the case where an IT resource under the supply condition of the set is insufficient for the demand condition of the set, since the assigning part adds a previously prepared IT resource to an IT resource under the demand condition of the set, an IT resource that sufficiently satisfies the extracted demand condition is provided.

In the IT resource management system of the present invention, it is preferable that, in a case where the IT resource under the supply condition of the set is sufficient to generate a surplus for the demand condition of the set, the assigning part purchases the surplus from the operating entity under the supply condition.

Even in the case where an IT resource under the supply condition of the set is sufficient to generate a surplus for the demand condition of the set, since the assigning part purchases the surplus of the IT resource from a demanding operating entity under the supply condition, the extracted supply condition is sufficiently satisfied.

In the IT resource management system of the present invention, it is preferable that the supply condition and the demand condition respectively include information representing a business policy defining a business requirement of the operating entity and a service policy defining a system performance requirement and/or an operation rule of an IT resource operated by the operating entity.

The supply condition and the demand condition respectively include the business policies and the service policies, so that the operating entities can set conditions, considering the respective business requirements, system performance requirements, and/or operation rules.

It is preferable that the IT resource management system of the present invention further includes a demand condition merging part for integrating a plurality of demand conditions whose business policies are the same, and accumulating the integrated demand conditions in the demand condition accumulating part as a virtual demand condition.

The demand condition accumulating part integrates a plurality of demand conditions with the same business policies, and accumulates the integrated demand conditions as a virtual demand condition, whereby the occurrence of a division loss in the case where a large supply condition is assigned with respect to a small demand condition can be prevented.

It is preferable that the IT resource management system of the present invention further includes a supply condition merging part for integrating a plurality of supply conditions whose business policies are the same, and accumulating the integrated supply conditions in the supply condition accumulating part as a virtual supply condition.

The supply condition accumulating part integrates a plurality of supply conditions with the same business policies, and accumulates the integrated supply conditions as a virtual supply condition, whereby a large demand condition, which cannot be accommodated by an IT resource supply condition of one corporation, can be accommodated. Furthermore, since a virtual IT resource supply condition is created and accumulated previously before a demand is received, the speed of determination at a time of a demand can be increased.

In the IT resource management system of the present invention, it is preferable that the demand condition includes presentation time information representing a time when the demand condition has been presented, and demand deadline information representing a demand deadline, and the IT resource management system further includes a demand fee calculating part for calculating a demand fee regarding a demand by the operating entity that has presented the demand condition, based on a time difference between the presentation time information and the demand deadline information.

As a time difference between the presentation time information and the demand deadline information is larger, the possibility of finding a supply condition that sufficiently satisfies a demand condition increases. More specifically, a division loss in which a large supply condition is assigned to a small demand condition is unlikely to occur. The demand fee calculating part calculates a demand fee regarding a demand by the operating entity that has presented the demand condition, based on the time difference between the presentation time information and the demand deadline information. Therefore, the possibility of finding a supply condition that sufficiently satisfies a demand condition can be reflected onto a demand fee.

In the IT resource management system of the present invention, it is preferable that the supply condition includes presentation time information representing a time when the supply condition has been presented, and supply deadline information representing a supply possible deadline, and the IT resource management system further includes a supply fee calculating part for calculating a supply fee regarding a supply by the operating entity that has presented the supply condition, based on a time difference between the presentation time information and the supply deadline information.

As a time difference between the presentation time information and the demand deadline information is larger, the possibility of finding a demand condition that sufficiently satisfies a supply condition increases. More specifically, the possibility of accommodating a large demand condition increases. The supply fee calculating part calculates a supply fee regarding a supply by the operating entity that has presented the supply condition, based on the time difference between the presentation time information and the supply deadline information. Therefore, the possibility of finding a demand condition that sufficiently satisfies a supply condition can be reflected onto a supply fee.

An IT resource management method of the present invention for managing a plurality of IT resources owned by a plurality of operating entities by a computer, includes: a supply condition accumulating operation of accumulating a supply condition of an IT resource input by an operating entity that desires to supply a surplus IT resource; a demand condition accumulating operation of accumulating a demand condition of an IT resource input by an operating entity that desires to compensate for a shortage of an IT resource; a matching operation of extracting a set of a supply condition and a demand condition matched with each other from the supply condition and the demand condition; and an assigning operation of changing a setting of an IT resource under the supply condition of the set, in such a manner that an IT resource under the supply condition of the set is available for the operating entity under the demand condition of the set.

Hereinafter, one embodiment of the present invention will be described in detail with reference to the drawings.

Embodiment 1

Embodiment 1 is directed to an IDC of a utility system having a mechanism for distributing a surplus IT resource among corporations that are customers.

FIG. 1 is a conceptual diagram showing the concept of an entire configuration of an IDC 1 in the present embodiment.

The IDC 1 manages IT resources 7, 8, and 9 of corporations A, B, and C that are customers. The IT resources 7, 8, and 9 can be increased/decreased on demand. The IDC 1 includes an IT resource management system 10 for distributing IT resources among different corporations. An exemplary operation conducted in the IT resource management system 10 will be described below.

Supply conditions of the IT resources 7, 9 are presented from the corporations A, C. The corporations A, C present the supply conditions (e.g., a CPU use ratio, the number of bytes used by a storage, a usable period, possible processing conditions (on-line/batch processing), etc.) of the IT resources 7, 9, which are expected to be surplus, to the IDC 1.

The corporation B presents the demand condition of the IT resource 8. The corporation B presents the demand condition (e.g., a CPU use ratio, the number of bytes used by a storage, a usable period, possible processing conditions (on-line/batch processing), etc.) of an insufficient IT resource.

In a surplus IT resource exchange market 2, the supply condition is matched with the demand condition to be fit therefor. For example, in the case where the supply condition of the corporation A is matched with the demand condition of the corporation B, the surplus of the IT resource 7 of the corporation A is supplied to the IT resource 8 of the corporation B.

The difference between the supply/demand between the corporations is compensated by the IDC 1. As a result of the matching, in the case where the supply condition is insufficient for the demand condition, the shortage is compensated using an IDC owning IT resource 6. On the contrary, in the case where the supply condition is too large for the demand condition, and the surplus IT resource becomes an oversupply, the IDC 1 purchases the oversupply properly.

Figure 2:
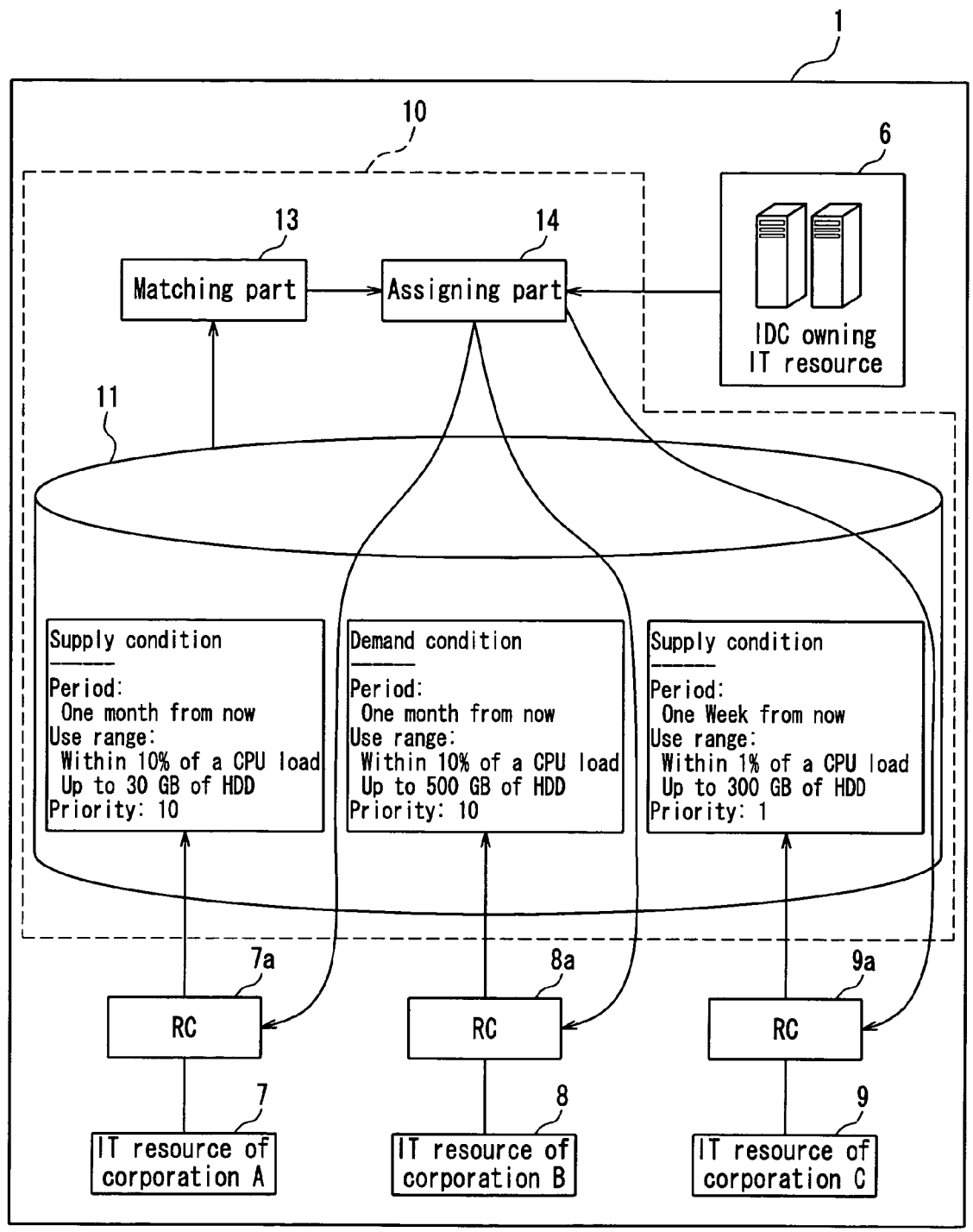
FIG. 2 is a functional block diagram showing an internal configuration of the IDC.

Next, the detailed configuration of the IDC 1 will be described. FIG. 2 is a functional block diagram showing an internal configuration of the IDC 1.

The IT resource management system 10 includes an accumulating part 11, a matching part 13, and an assigning part 14. The accumulating part 11 accumulates supply conditions and demand conditions. The matching part 13 extracts suitable conditions from the supply conditions and demand conditions accumulated in the accumulating part 11. The assigning part 14 assigns the IT resources 7, 8, and 9 of the corporations A, B, and C in accordance with the conditions extracted by the matching portion 13. Furthermore, in the case where the conditions extracted by the matching part 13 are insufficient, the assigning part 14 compensates for the shortage using the IDC owning IT resource 6.

In the IT resources 7, 8, and 9 of the corporations A, B, and C, resource coordinators (hereinafter, referred to as "RCs") 7a, 8a, and 9a are deployed. The corporations A, B, and C define supply conditions of a surplus IT resource and demand conditions of an insufficient IT resource with respect to the RCs 7a, 8a, and 9a. The RCs 7a, 8a, and 9a provide information representing the supply conditions and the demand conditions to the IT resource management system 10.

The IT resource management system 10 can be configured, for example, on a computer of a server or the like. The functions of the matching part 13 and the assigning part 14 can be realized when a CPU of a computer executes a predetermined program. As the accumulating part 11, a portable recording medium such as a flexible disk or a memory card, a recording medium in a recording apparatus on a network, or the like, as well as a recording medium such as a hard disk or a RAM stored in a computer can be used.

The IT resource management system 10 can be composed of one server, or can be configured in such a manner that the function is distributed by a plurality of servers.

Figure 3:
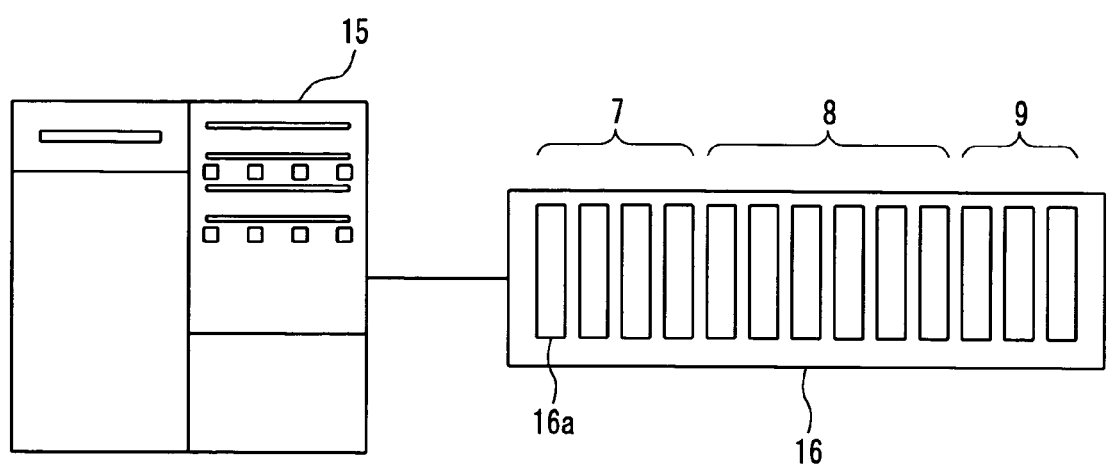
FIG. 3 shows an example of physical configurations of an IT resource management system and IT resources.

FIG. 3 shows an example of physical configurations of the IT resource management system 10 and the IT resources 7, 8, and 9. As shown in FIG. 3, the IT resource management system 10 and the IT resources 7, 8, and 9 are composed of, for example, a blade server 16 including a plurality of server blades 16a, and a deployment server 15 managing the blade server 16. The blade server 16 and the deployment server 15 are connected to each other, for example, through a LAN or the like. The IT resource management system 10 can be configured on the deployment server 15. The plurality of server blades 16a in one blade server 16 are assigned to the IT resource 7 of the corporation A, the IT resource 8 of the corporation B, and the IT resource 9 of the corporation C. The RCs 7a, 8a, and 9a can be operated on the deployment server 15. The IT resources 7, 8, and 9 can also be composed of independent blade servers that are physically independent from each other.

Figure 4:
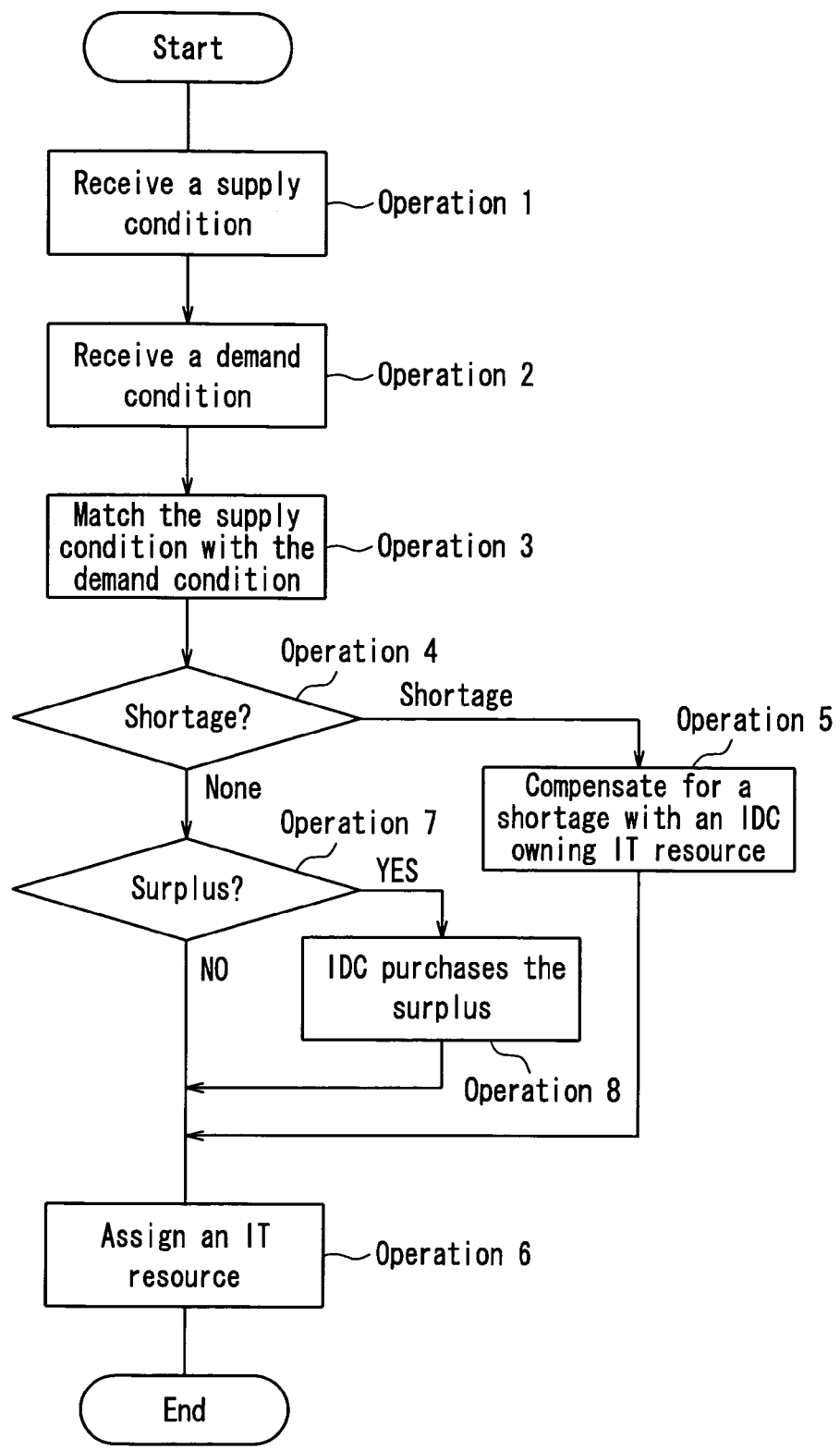
FIG. 4 is a flow chart showing an operation of surplus IT resource management processing by the IT resource management system.

Next, the operation for the IT resource management system 10 to distribute a surplus IT resource will be described with reference to FIG. 4. FIG. 4 is a flow chart showing an operation of surplus IT resource management processing by the IT resource management system 10.

The summary of the processing will be described with reference to FIG. 4. First, the IT resource management system 10 receives supply conditions (Operation 1). Generally, a plurality of supply conditions are presented from a plurality of corporations. The IT resource management system 10 receives data representing the supply conditions sent from the corporation and stores it in the accumulating part 11.

Next, the IT resource management system 10 receives demand conditions (Operation 2). Generally, a plurality of demand conditions are presented. The IT resource management system 10 receives data representing the demand conditions sent from a corporation and stores it in the accumulating part 11.

The matching part 13 matches the supply conditions and the demand conditions stored in the accumulating part 11 with each other (Operation 3). Exemplary data configurations of the supply conditions and the demand conditions and the detail of the matching processing will be described later.

The assigning part 14 determines whether or not there is a shortage with respect to the demand conditions in the supply conditions extracted as a result of the matching (Operation 4).

In the case where the extracted supply conditions are insufficient for the demand conditions, the assigning part 14 can compensate for the shortage using the IDC owning IT resource 6 (Operation 5).

For example, in the case where the supply conditions are "400 GB of a hard disk capacity can be supplied" while the demand conditions are "500 GB of a hard disk capacity is required", the shortage is 100 GB. The assigning part 14 allows a demanding corporation to use 100 GB of a hard disk of the IDC owning IT resource 6.

In the case of no shortage, the assigning part 14 determines whether or not there is a surplus with respect to the demand conditions in the supply conditions extracted as a result of the matching (Operation 7).

In the case where there is a surplus with respect to the demand conditions in the extracted supply conditions, the assigning part 14 performs processing in which the IDC purchases the surplus and adds it to the IDC owning IT resource 6 (Operation 8).

In the case of no surplus, the assigning part 14 assigns an IT resource (Operation 6). More specifically, the assigning part 14 assigns an IT resource presented by the supply conditions extracted as a result of the matching to a corporation that demands an IT resource under the demand conditions extracted as a result of the matching, in such a manner that the corporation can use the IT resource.

In the processing shown in FIG. 4, the IT resource management system 10 receives supply conditions at all times (Operation 1), and may perform the processing in Operations 2 to 8 every time the IT resource management system receives one demand condition. Such processing is used for on-line processing. At this time, the processing in Operations 7 and 8 is not necessarily required to be performed at a timing of receiving demand conditions, and batch processing may be performed appropriately.

Furthermore, the following may be performed. The IT resource management system 10 receives supply conditions (Operation 1) and receives demand conditions (Operation 2) at all times, accumulates the supply conditions and the demand conditions, and performs Operations 3 to 8 with batch processing.

Figure 5:
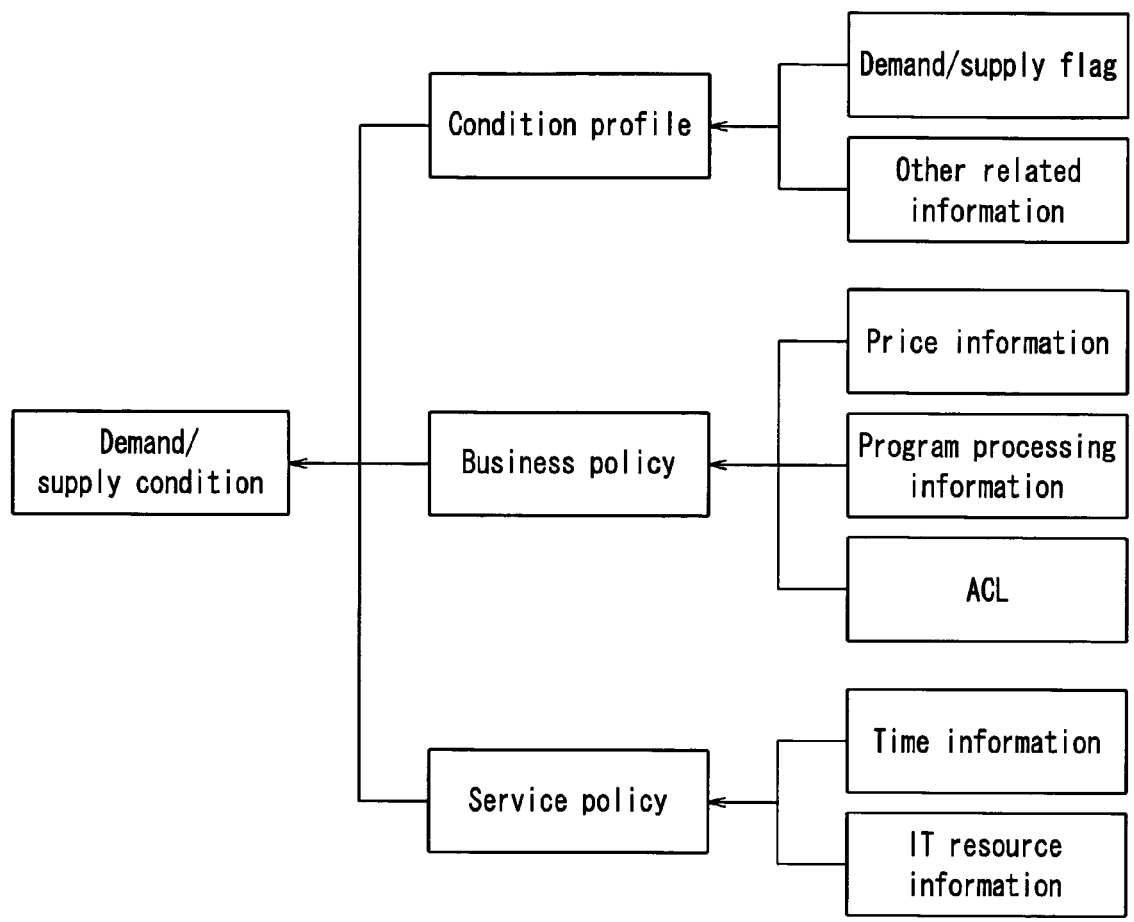
FIG. 5 shows an exemplary schema of information showing a demand condition and a supply condition.

Next, exemplary data configurations of the supply conditions and the demand conditions will be described. FIG. 5 shows an exemplary schema of information representing the demand conditions and the supply conditions.

It is preferable that the demand conditions and the supply conditions can be described with the similar schema so as to facilitate the matching processing. The schema shown in FIG. 5 can be used for both the demand conditions and the supply conditions.

The demand conditions and the supply conditions include information such as the amount of IT resources (a CPU load, a storage region, etc.), a use time band, a usable period, accounting conditions, program processing contents (batch processing, on-line processing, etc.), and business constrains (that can be provided only to a group corporation, etc.). The schema shown in FIG. 5 corresponds to these pieces of organized information.

In the schema shown in FIG. 5, the demand conditions/supply conditions include a condition profile, a business policy, and a service policy.

The condition profile includes a demand/supply flag, and other related information. Depending upon the demand/supply flag, it is determined whether certain condition data is a supply condition or a demand condition.

The business policy refers to business requirements of a corporation that is an owner of an IT resource. For example, price information, program processing information, an ACL determining whether or not a corporation is a group corporation, and the like are included in the business policy.

The contents of the price information are, for example, as follows: "a supply fee will be charged by ¥___ with respect to a CPU use ratio" or "an IT resource that can be used by ¥___ will be demanded preferentially with respect to a CPU use ratio". Examples of the program processing information include "on-line processing" and "batch processing". Examples of the ACL include "a bank-related corporation is OK as a corporation for a supply destination, but a corporation in the XX business world is rejected" and "an IT resource of a group corporation will be demanded preferentially".

The service policy defines system performance requirements and/or an operation rule of an IT resource operated by a corporation. For example, use time information, supply time information, IT resource information, and the like are included in the service policy.

An example of the service policy of the supply conditions includes "at night, when a CPU load becomes 10% or less, 50% of an IT resource may be supplied for batch processing until 7 a.m.". An example of the service policy of the demand conditions includes "at night, if batch processing is unlikely to be finished before 5 a.m., an IT resource will be demanded".

If the business policy and the service policy are described together, a plurality of demand conditions or a plurality of supply conditions having the same business policies can be merged.

In a general IT resource assignment, matching is performed based on the detail of IT resource information inside a service policy. However, actually, unless "business policy" such as "price", "program processing contents", and "ACL" is matched, demand/supply processing cannot be performed. Thus, by performing merging processing with respect to a business policy before performing detailed matching processing of an IT resource, a division loss and a surplus resource can be reduced, and an efficient assignment can be performed (the detail of processing will be described later).

FIG. 6 shows an example of specific data representing supply conditions described with the schema shown in FIG. 5. The supply conditions shown in FIG. 6 are described in an XML format, for example.

In FIG. 6, a condition profile is described in a portion represented by A, a business policy is described in a portion represented by B, and a service policy is described in a portion represented by C.

In the portion represented by A, a demand/supply flag is described. More specifically, a supply is shown with a <DemandSupply> tag.

In the business policy, price information is described in a portion represented by B1. In the portion represented by B2, program processing information is described, and its contents are "on-line processing". In the portion represented by B3, an ACL is described, and its contents are "f_company.com is accepted" "h_company.com is rejected".

In the service polity, time information is described in a portion represented by C1, and its contents are "0 a.m. to 7 a.m. in December, 2004". In the portion represented by C2, IT resource information is described, and its contents are "if the load of a CPU is within 10%, the ability up to 50% of the CPU can be used".

Figure 7:
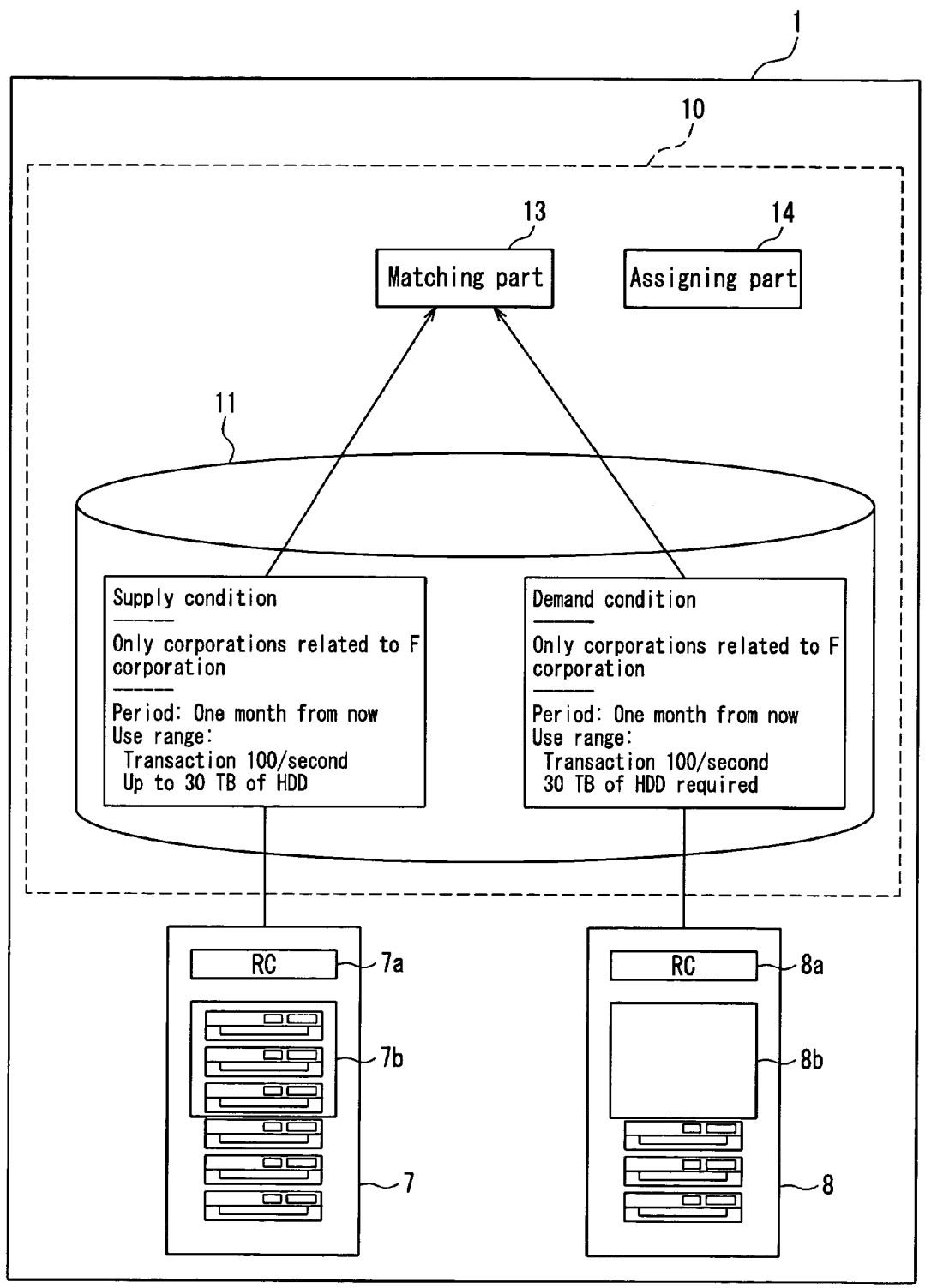
FIG. 7 shows a data flow when the demand condition and the supply condition are presented.

Next, the matching processing and assigning processing in the IT resource management system 10 will be described in detail. FIG. 7 shows a flow of data when demand conditions and supply conditions are presented, and matched with each other. In FIG. 7, the same components as those shown in FIG. 2 are denoted with the same reference numerals as those therein, and the description thereof will be omitted here.

In FIG. 7, the IT resources 7, 8 respectively show logical configurations, and do not show physical configurations thereof.

Hereinafter, the case where the service policy of the demand conditions is the number of transactions will be exemplified, and the processing from the presentation of the demand and supply conditions to the matching and the actual assignment of resources will be described. In the RCs 7a, 8a of the IT resources 7, 8 of the corporations A, B, demand conditions and supply conditions are previously registered.

For example, in the case where a surplus 7b corresponding to the supply conditions registered in the RC 7a of the corporation A occurs in the IT resource 7 of the corporation A, the RC 7a automatically detects the surplus 7b. Upon detecting the surplus 7b, the RC 7a transmits the previously registered supply conditions to the IT resource management system 10. The IT resource management system 10 receives the transmitted supply conditions and accumulates them in the accumulating part 11.

On the other hand, in the case where a shortage 8b occurs in the IT resource 8 to such a degree that the demand shown by the demand conditions registered in the RC 8a of the corporation B is required, the RC 8a automatically detects the shortage 8b of the IT resource 8. The RC 8a transmits the previously registered demand conditions to the IT resource management system 10. The IT resource management system 10 receives the transmitted demand conditions, and accumulates them in the accumulating part 11.

Figure 8:
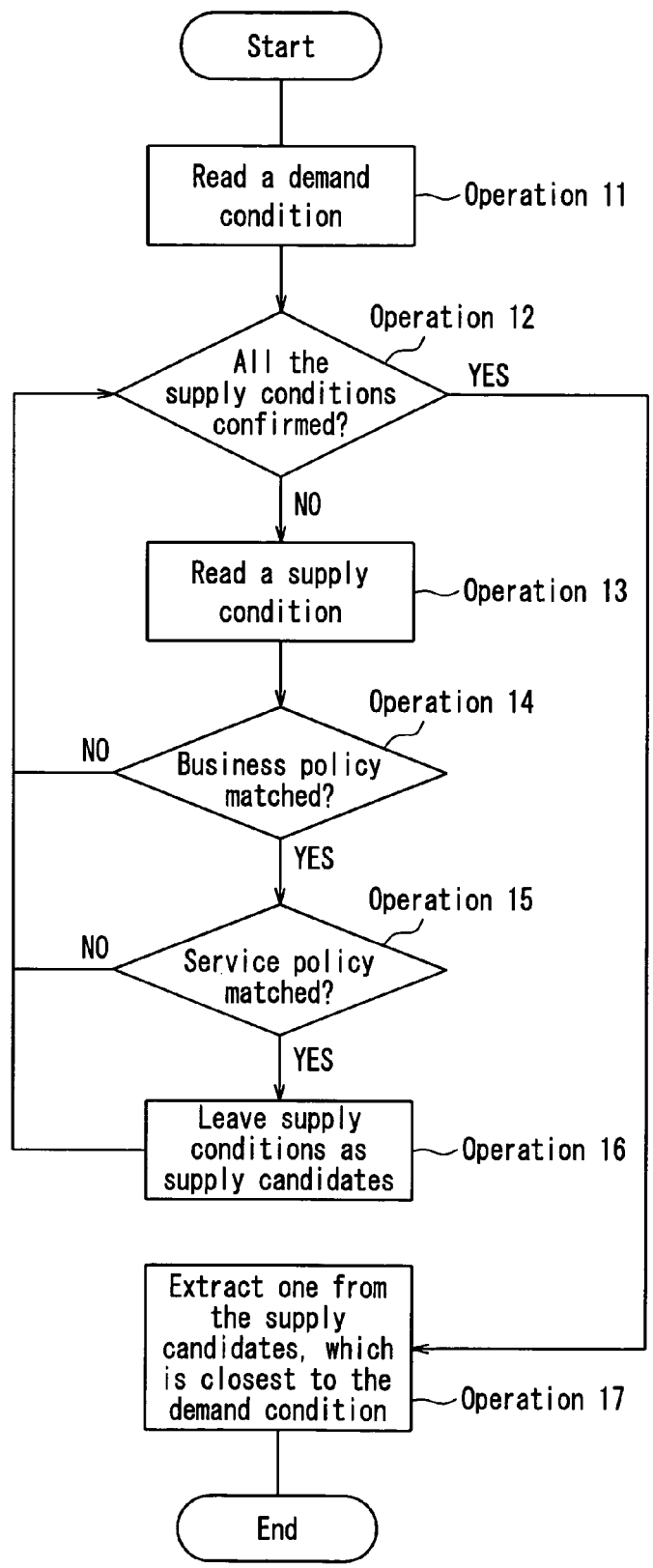
FIG. 8 is a flow chart showing a flow of matching processing.

The matching part 13 performs matching processing of the supply conditions and the demand conditions accumulated in the accumulating part 11. FIG. 8 is a flow chart showing a flow of the matching processing.

In the matching processing, first, the matching part 13 reads the demand condition from the accumulating part 11 (Operation 11). The matching part 13 determines whether or not all the supply conditions accumulated in the accumulating part 11 have been confirmed (Operation 12). More specifically, the matching part 13 determines whether or not the unconfirmed supply conditions are present in the accumulating part 11. In the case where the unconfirmed supply conditions are present, the matching part 13 reads the unconfirmed supply condition (Operation 13). The matching part 13 compares the business policy of the read supply condition with that of the demand condition, and determines whether or not the business policies are matched with each other.

FIG. 9 shows an example of the case where the business policy of the demand condition is matched with that of the supply condition. In FIG. 9, data shown on the left side is a demand condition 21, and data on the right side is a supply condition 22. Regarding the contents of the price information B1, the program information B2, and the ACL B3 in the business policy B, the demand condition 21 is compared with the supply condition 22, respectively. For example, in the case where the covering range of the supply condition is larger than that of the demand condition, it is determined that they are matched with each other.

As a comparison method, for example, those which have the same tag name can be set to be the same items to be compared. The contents of elements or attributes associated with the respective tags are compared.

As an example, in the case where the price information B1 of the demand condition 21 is compared with that of the supply condition 22, elements of <PriceKey> in a lower level of <PriceItem> in a lower level of <PriceType> are compared with each other. In this case, both of the elements are "CPUs", so that it can be determined that the demand condition 21 is matched with the supply condition 22 in the item <PriceKey>.

Furthermore, items whose tags are not at the same hierarchical level may not be considered to be the same items. In this case, items whose tag names and tag levels are matched are compared with each other.

Furthermore, in the case where matching cannot be determined by simple comparison processing, for example, as in <PriceEvaluator> of the price information B1, an application of a determination logic may also be assigned to a <tag name+Evaluator> tag. In this case, it is determined whether or not the demand condition and the supply condition are matched with each other based on the determination results by the assigned application.

For the processing of comparing data in an XML format shown in FIG. 9, for example, software for analyzing an XML can be used.

In Operation 14 shown in FIG. 8, in the case where the business policies are matched with each other (in the case of YES), the matching part 13 determines whether or not the service policies are matched with each other by comparing the service policy of the read supply condition with the service policy of the demand condition (Operation 15). In the case where the service policies are not matched with each other (in the case of NO in Operation 14), the process returns to the processing in Operation 12.

Figure 10:
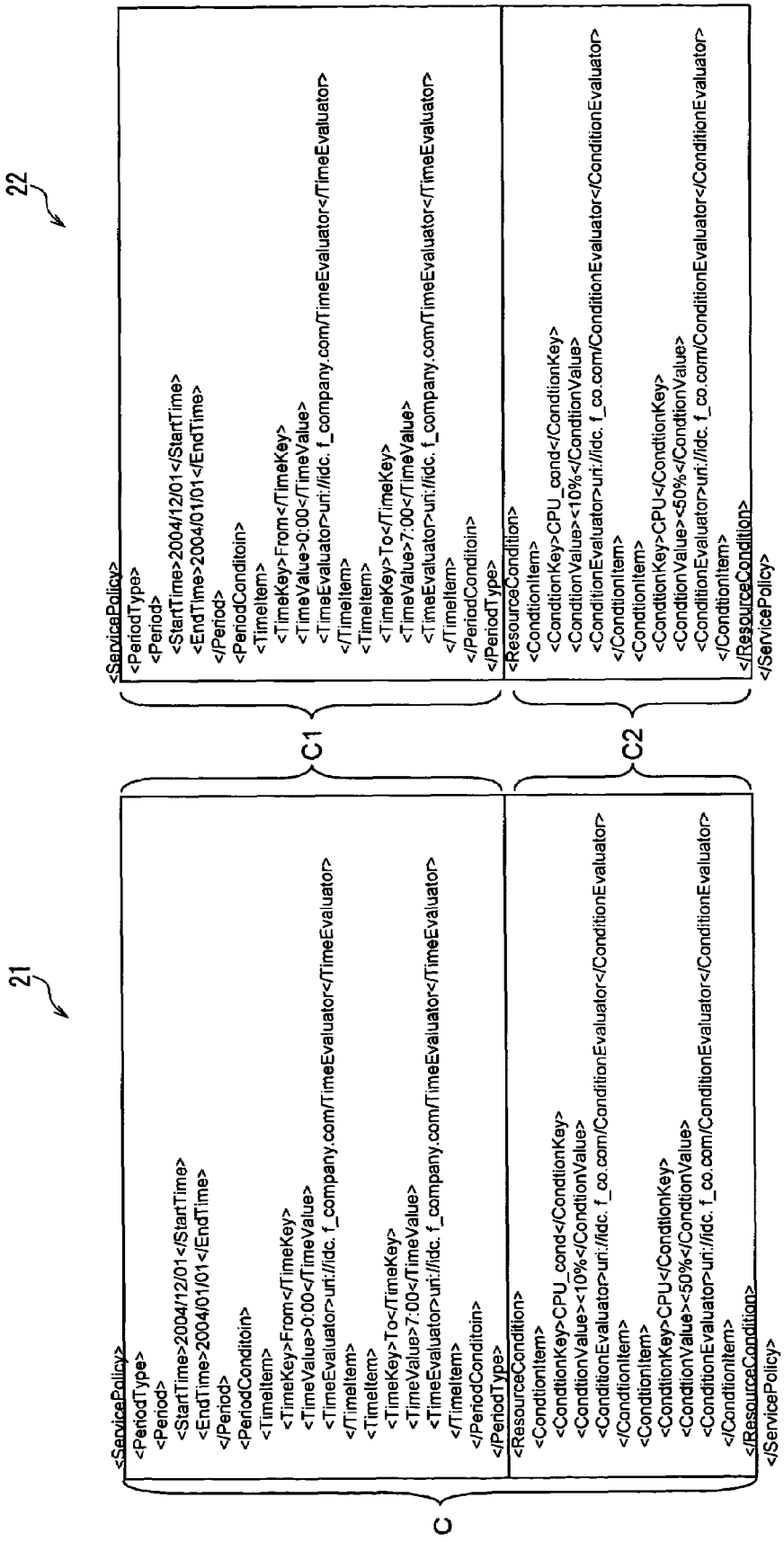
FIG. 10 shows an example of the case where the service policy of the demand condition is matched with that of the supply condition.

FIG. 10 shows an example of the case where the service policy of the demand condition is matched that of the supply condition. In FIG. 10, data shown on the left side are a demand condition 21, and data shown on the right side is a supply condition 22. Regarding the contents of time information C1 and IT resource information C2 in the service policy C, the demand condition 21 are compared with the supply condition 22. For example, in the case where the covering range of the supply condition is larger than that of the demand condition, it is determined that the supply condition is matched with the demand condition. For example, in the case where a supply possible time band among the supply condition is longer than a use time band among the demand condition, etc., both of them are determined to be matched with each other.

In the case where the service policies are not matched with each other in Operation 15 shown in FIG. 8 (in the case of NO), the process returns to Operation 12. In the case where the service policies are matched with each other (in the case of YES in Operation 15), the matching part 13 accumulates the supply conditions whose service policy is matched in the accumulating part 11 as a supply candidate (Operation 16).

After the processing in Operation 16, the processing in Operation 12 is performed again. Thus, the matching part 13 compares all the supply conditions accumulated in the accumulating part 11 with the supply conditions (Operations 13 to 16).

In the case where the comparison processing is finished with respect to all the supply conditions (in the case of YES in Operation 12), the matching part 13 extracts one supply condition from those accumulated in the accumulating part 11, which is closest to the demand conditions (Operation 17). Consequently, one set of the demand condition and the supply condition is extracted.

The matching processing is not necessarily performed immediately after the demand conditions are received. For example, matching processing can be performed for each day or each time. However, if there is a time limit regarding the demand conditions, the processing is performed within the time limit.

Figure 11:
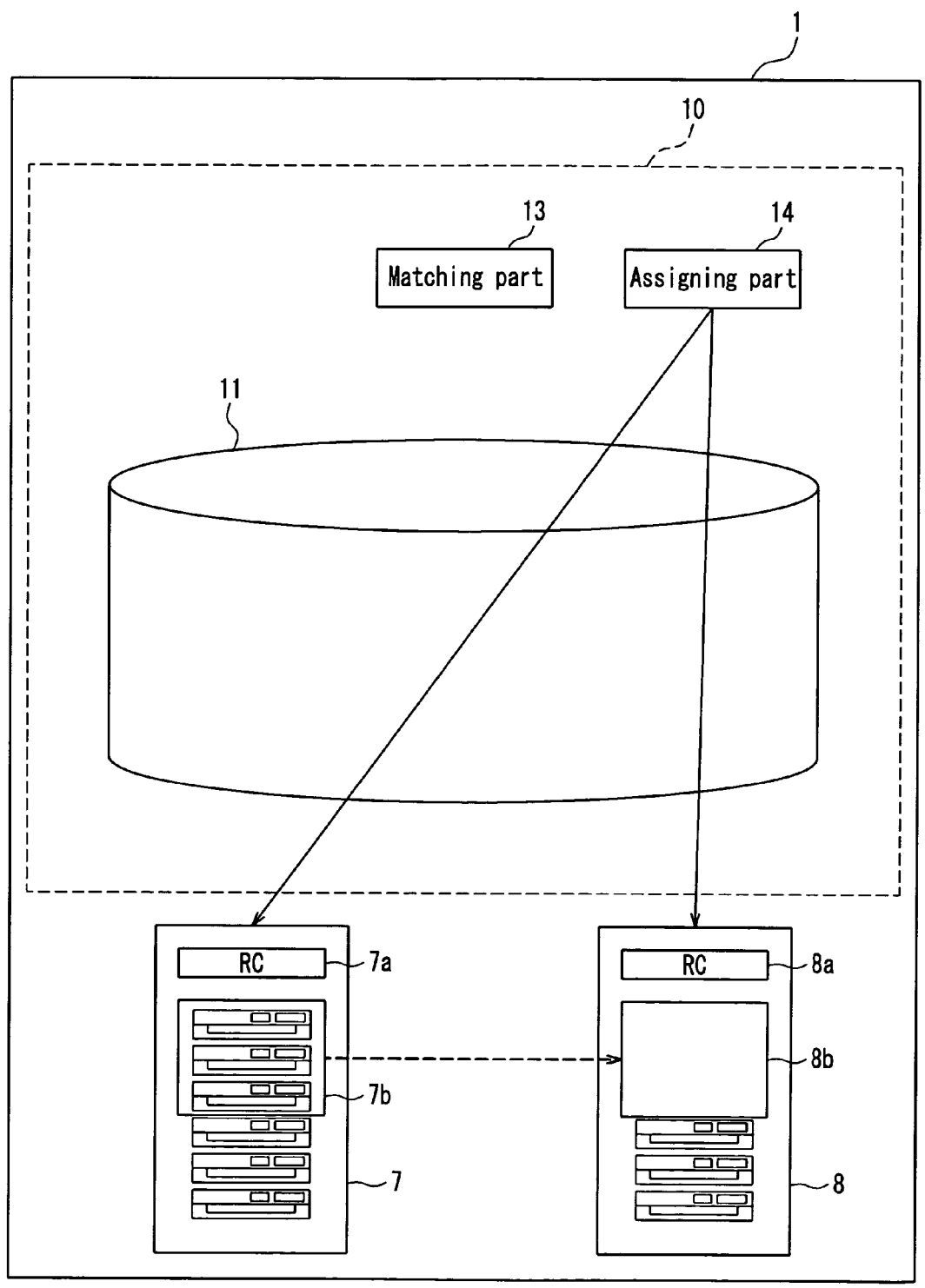
FIG. 11 shows a data flow in assigning processing of an IT resource.

Based on the pair of the supply conditions and the demand conditions extracted by the matching processing, the assigning part 14 assigns an IT resource. FIG. 11 shows a flow of data in assigning processing of an IT resource. In FIG. 11, the same components as those shown in FIG. 2 are denoted with the same reference numerals as those therein, and the description thereof will be omitted here.

For example, the processing of the assigning part 14 will be described in the case where the contents of the extracted supply condition are that the corporation A supplies the surplus 7b of the IT resource 7, and the contents of the demand condition matched with the supply condition are that the corporation B compensates for the shortage 8b of the IT resource 8.

The assigning part 14 informs the RC 7a of the corporation A that the blade server of the surplus 7b is used by the corporation B. The RC 7a changes the logical setting of the blade server so that the corporation B can use the blade server corresponding to the surplus 7b.

Furthermore, the assigning part 14 requests the RC 8a of the corporation B to compensate for the shortage 8b by assigning the blade server of the surplus 7b of the corporation A to the IT resource 8 of the corporation B. The RC 8a changes the logical setting of the blade server so that the surplus 7b can be used as the IT resource 8 of the corporation B. Consequently, the blade server that is the IT resource 7 of the corporation A is assigned to the IT resource 8 of the corporation B.

Software used by the corporation B is installed in the blade server assigned to the IT resource 8 of the corporation B, and started up. Thus, the corporation B can use the surplus 7b of the IT resource 7 of the corporation A.

The operation in which the surplus 7b of the IT resource 7 is assigned to the IT resource 8 of the corporation B may be the physical movement of an apparatus such as a server, or may be the mere change of the logical configuration inside the apparatus.

In the present embodiment, the exchange of an IT resource between the corporations A and B has been described. In the actual IDC, a plurality of IT resources owned by a plurality of corporations in addition to the IT resources of the corporations A and B are present. Therefore, there are also a plurality of supply conditions and demand conditions accumulated in the accumulating part 11.

Embodiment 2

According to Embodiment 2, a merging function is added to the accumulating part 11 of the IT resource management system 10 according to Embodiment 1. The merging function is to integrate or merge demand conditions or supply conditions with the same or similar business policies to generate and accumulate virtual demand conditions or supply conditions.

Figure 12:
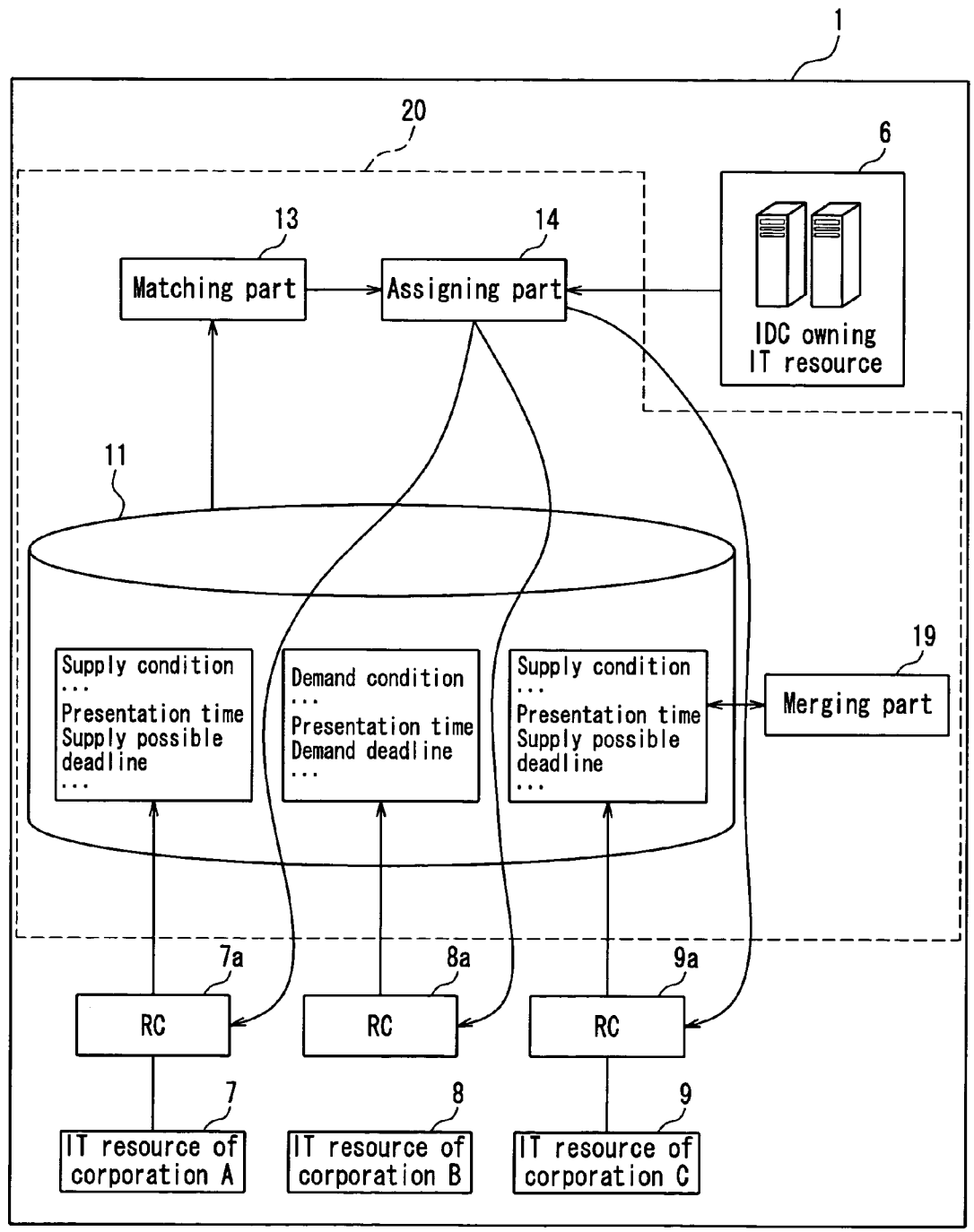
FIG. 12 is a functional block diagram showing a configuration of an IDC in Embodiment 2.

FIG. 12 is a functional block diagram showing a configuration of an IDC 1 including an IT resource management system 20 in the present embodiment. The configuration and processing of the IT resource management system 20 in FIG. 12 are similar to those of the IT resource management system 10 in Embodiment 1 except for the following points, so that the description of the similar components will be omitted.

The IT resource management system 20 is different from the IT resource management system 10 in Embodiment 1 in that the IT resource management system 20 includes a merging part 19. The merging part 19 merges a plurality of supply conditions or a plurality of demand conditions accumulated in the accumulating part 11 to generate virtual supply conditions or demand conditions. The generated virtual supply conditions or demand conditions are accumulated in the accumulating part 11.

Figure 13:
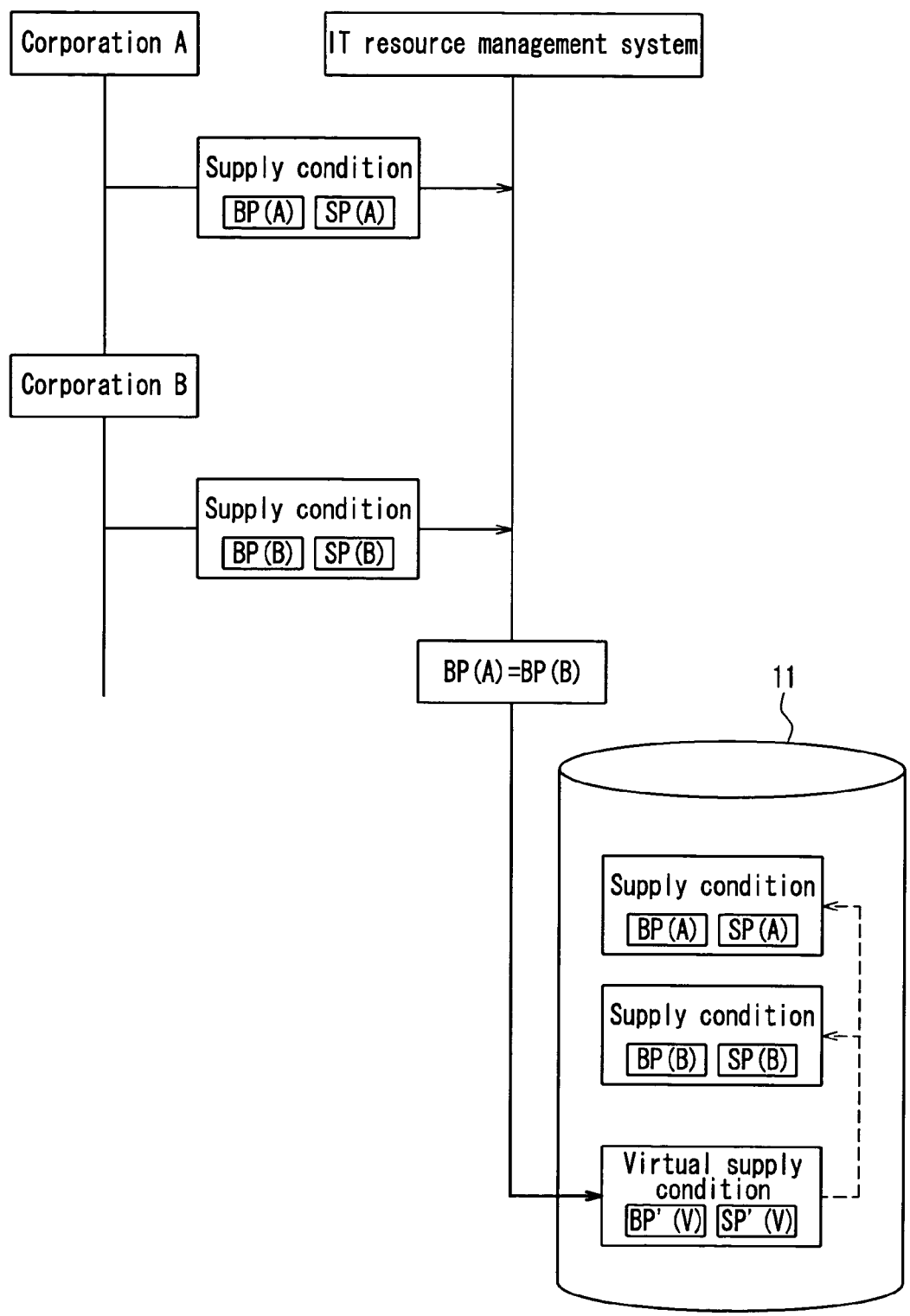
FIG. 13 is a conceptual diagram showing a flow of merging processing of supply condition.

FIG. 13 is a conceptual diagram showing a flow of merging processing of the supply conditions.

In FIG. 13, BP(A) represents a business policy of the corporation A, and SP(A) represents a service policy of the corporation A. Hereinafter, similarly, it is assumed that BP(X) and SP(X) represent a business policy and a service policy of a corporation X, respectively.

The corporations A and B transmit supply conditions to the accumulating part 11 of the IT resource management system 10.

The merging part 19 compares the business policies of the supply conditions of the corporations A and B with each other. More specifically, the merging part 19 determines whether or not BP(A) is the same as BP(B) (BP(A)=BP(B)). The supply conditions are described separately with respect to the business policy and the service policy, so that the business policies can be compared with each other. As a comparison method, for example, a method similar to the comparison method used in the matching processing in Embodiment 1 can be used. In the comparison between the business policies, even if the business policies to be compared are not exactly the same, when the difference is within a range that does not cause a problem in business, they are considered to be the same.

If the business policies are the same, i.e., BP(A)=BP(B), the merging part 19 merges the supply condition of the corporation A with the supply condition of the corporation B to generate a virtual supply condition. It is assumed that the business policy of the virtual supply condition is BP'(V), and the service policy thereof is SP'(V). BP'(V) represents a supply condition showing that BP'(V) obtained by merging BP(A) with BP(B) can be provided. BP'(V) is set so as to refer to the supply conditions BP(A) and BP(B) of the corporations A and B. SP'(V) represents supply conditions showing that SP'(V) obtained by merging SP(A) with SP(B) can be supplied.

The processing of merging the above-mentioned plurality of supply conditions to generate virtual supply conditions may be performed by the merging part 19 every time supply conditions are received from a corporation, or such merging may be performed with batch processing at a constant interval.

As described above, the merging part 19 accumulates virtual supply conditions including BP'(V) and SP'(V) obtained by merging a plurality of supply conditions. Consequently, during the matching by the matching part 13, large demand conditions that cannot be accommodated only by supply conditions of one corporation (i.e., the supply conditions of the corporation A or the supply conditions of the corporation B) can be matched with virtual supply conditions. Furthermore, virtual supply conditions are previously accumulated before a demand is received, whereby the speed of determination processing can be enhanced during matching.

Figure 14:
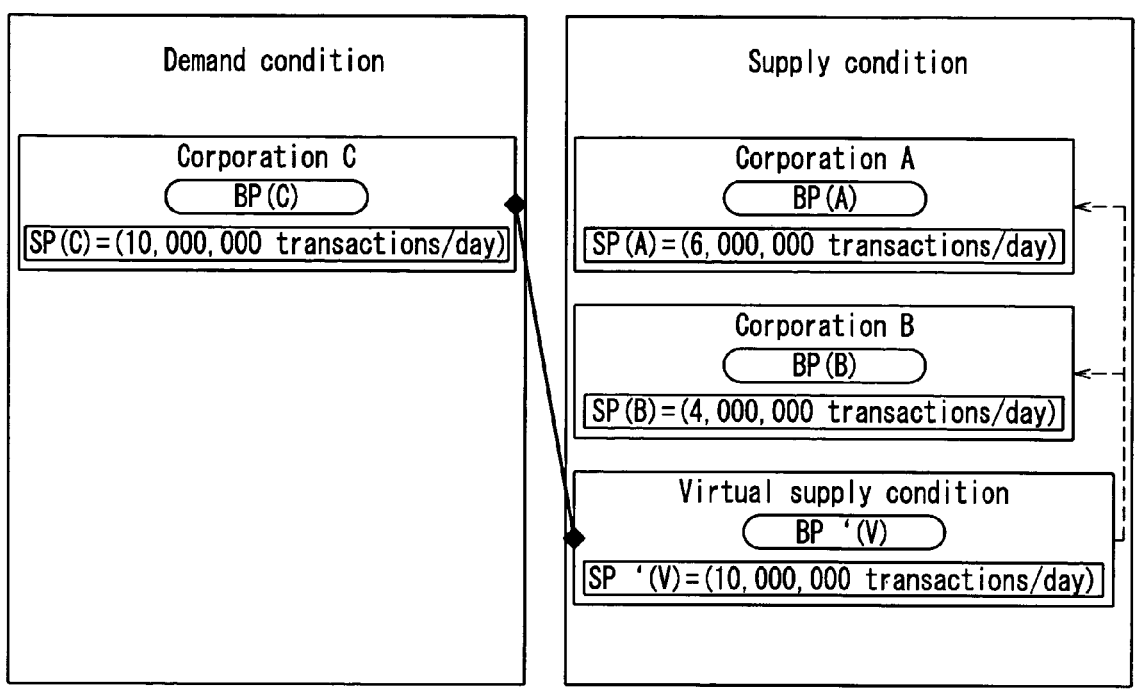
FIG. 14 shows an example of the case where supply conditions including BP'(V) and SP'(V) can accommodate a large demand condition that cannot be accommodated by a supply condition of one corporation.

FIG. 14 shows an example of the case where the supply conditions including BP'(V) and SP'(V) can accommodate the large demand conditions that cannot be accommodated by supply conditions of one corporation.

In the example shown in FIG. 14, it is assumed that BP(A)=BP(B)=BP(C). The business policies of the corporations A and B are the same (BP(A)=BP(B)), so that the supply conditions of the corporations A and B are merged to generate virtual supply conditions including BP'(V) and SP'(V). Herein, the contents of SP(A) are "6,000,000 transactions/day", and the contents of SP(B) are "4,000,000 transactions/day". Thus, the contents of SP'(V) obtained by merging SP(A) with SP(B) become "10,000,000 transactions/day".

The corporation C presents the demand conditions including BP(C) and SP(C). The contents of SP(C) are "10,000,000 transactions/day". SP(A) in the supply conditions of the corporation A or SP(B) in the supply conditions of the corporation B is not sufficient for SP(C). On the other hand, SP'(V) in the virtual supply conditions obtained by merging the supply conditions of the corporations A and B satisfies SP(C).

Figure 15:
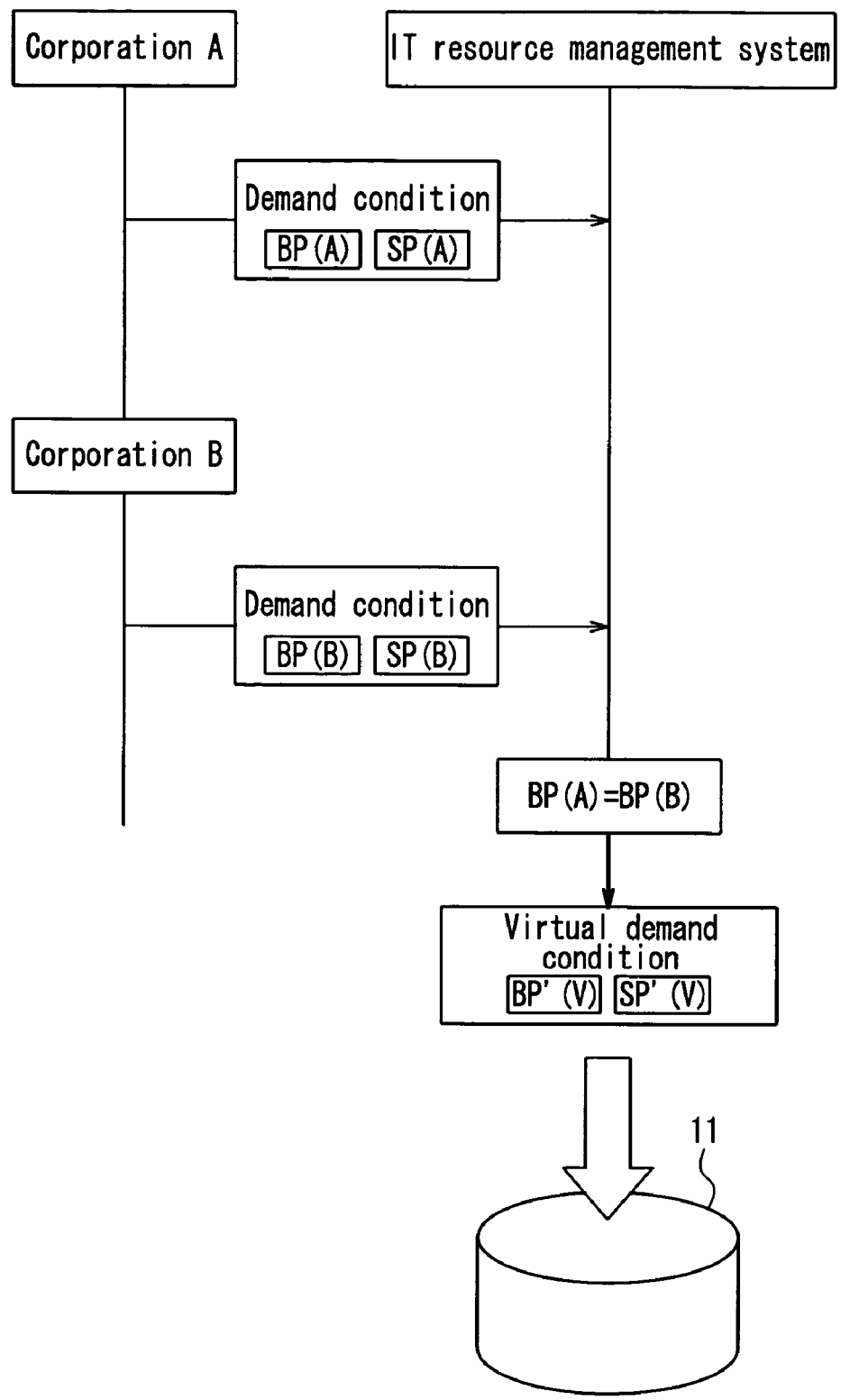
FIG. 15 is a conceptual diagram showing a flow of merging processing of demand conditions.

The merging processing of the supply conditions have been described above. Next, the merging processing of the demand conditions will be described. FIG. 15 is a conceptual diagram showing a flow of merging processing of the demand conditions.

The corporations A and B transmit demand conditions to the accumulating part 11 of the IT resource management system 10. The merging part 19 compares the business policies of the demand conditions of the corporations A and B with each other. More specifically, the merging part 19 compares BP(A) with BP(B).

If the business policies are the same (BP(A)=BP(B), the merging part 19 generates virtual demand conditions including SP'(V) obtained by merging SP(A) with SP(B). The matching part 13 accesses the supply conditions accumulated in the accumulating part 11, and searches for the supply conditions to be matched with the virtual demand conditions generated by the merging part 19.

The processing of merging a plurality of demand conditions to generate virtual demand conditions may be performed by the merging part 19 every time demand conditions are received from a corporation, or such merging may be performed periodically with batch processing.

Thus, the merging part 19 accumulates virtual demand conditions generated by merging a plurality of demand conditions, whereby the matching part 13 can prevent the assignment of excessively sufficient supply conditions to the demand conditions. More specifically, the occurrence of a division loss can be prevented.

Figure 16:
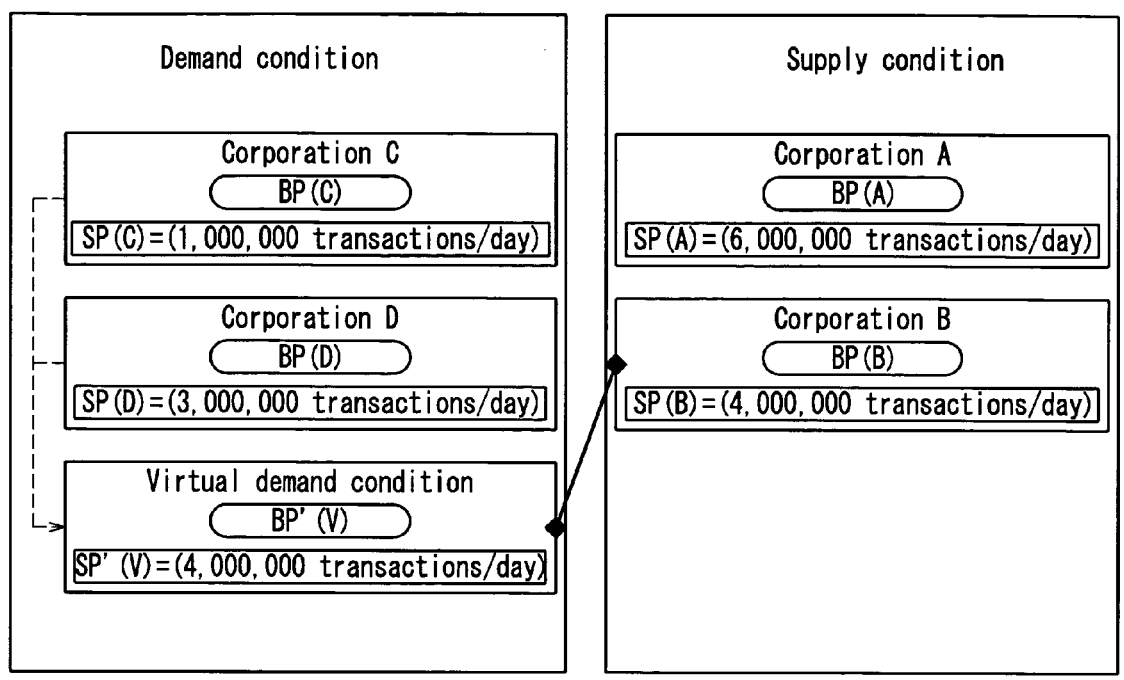
FIG. 16 shows an example of the case where the occurrence of a division loss can be prevented by the virtual demand condition.

FIG. 16 shows an example of the case where the occurrence of a division loss can be prevented by the virtual demand conditions.

In the example shown in FIG. 16, it is assumed that BP(A)=BP(B)=BP(C)=BP(D). Since the business policies of the corporations C and D are the same (BP(C)=BP(D)), the demand conditions of the corporations C and D are merged to generate virtual demand conditions including BP'(V) and SP'(V). Herein, the contents of SP(C) are "1,000,000 transactions/day", and the contents of SP(D) are "3,000,000 transactions/day". Thus, the contents of SP'(V) obtained by merging SP(C) with SP(D) become "4,000,000 transactions/day".

In the example shown in FIG. 16, the corporation A presents supply conditions including SP(A)="6,000,000 transactions/day". The corporation B presents supply conditions including SP(B)="4,000,000 transactions/day".

In the case where the demand conditions of the corporations C and D are not merged, and the matching part 13 matches the respective demand conditions with the supply conditions, for example, the demand conditions of the corporation C are matched with the supply conditions of the corporation B, and the demand conditions of the corporation D are matched with the supply conditions of the corporation A. In the case of matching the corporation C and the corporation B, SP(C)="1,000,000 transactions/day" is assigned with respect to the supply of SP(B)="4,000,000 transactions/day". Consequently, the "3,000,000 transactions/day" becomes a surplus, which causes a division loss.

In contrast, in the case of matching the virtual demand conditions including BP'(V) and SP'(V) obtained by merging the demand conditions of the corporations C and D by the merging part 19, with the supply conditions, since SP'(V) is "4,000,000 transactions/day", SP'(V) is matched with SP(B) without a surplus or a shortage. Thus, the matching part 13 assigns the virtual demand conditions to the supply conditions of the corporation B, whereby the occurrence of a division loss can be prevented. Furthermore, the supply conditions of the corporation A remain without being assigned, so that the supply conditions of the corporation A can accommodate the case where other demand conditions are presented. Accordingly, an IT resource can also be used efficiently.

Embodiment 3

According to Embodiment 3, a fee calculating function is added to the IT resource management system according to Embodiment 2. The fee calculating function is to calculate a fee incurred when a corporation supplies or demands an IT resource.

The configuration and processing of the IT resource management system in the present embodiment are the same as those of the IT resource management system 20 in Embodiment 2 except that the IT resource management system in the present embodiment includes a fee calculating part, so that the description of the same components will be omitted.

Figure 17:
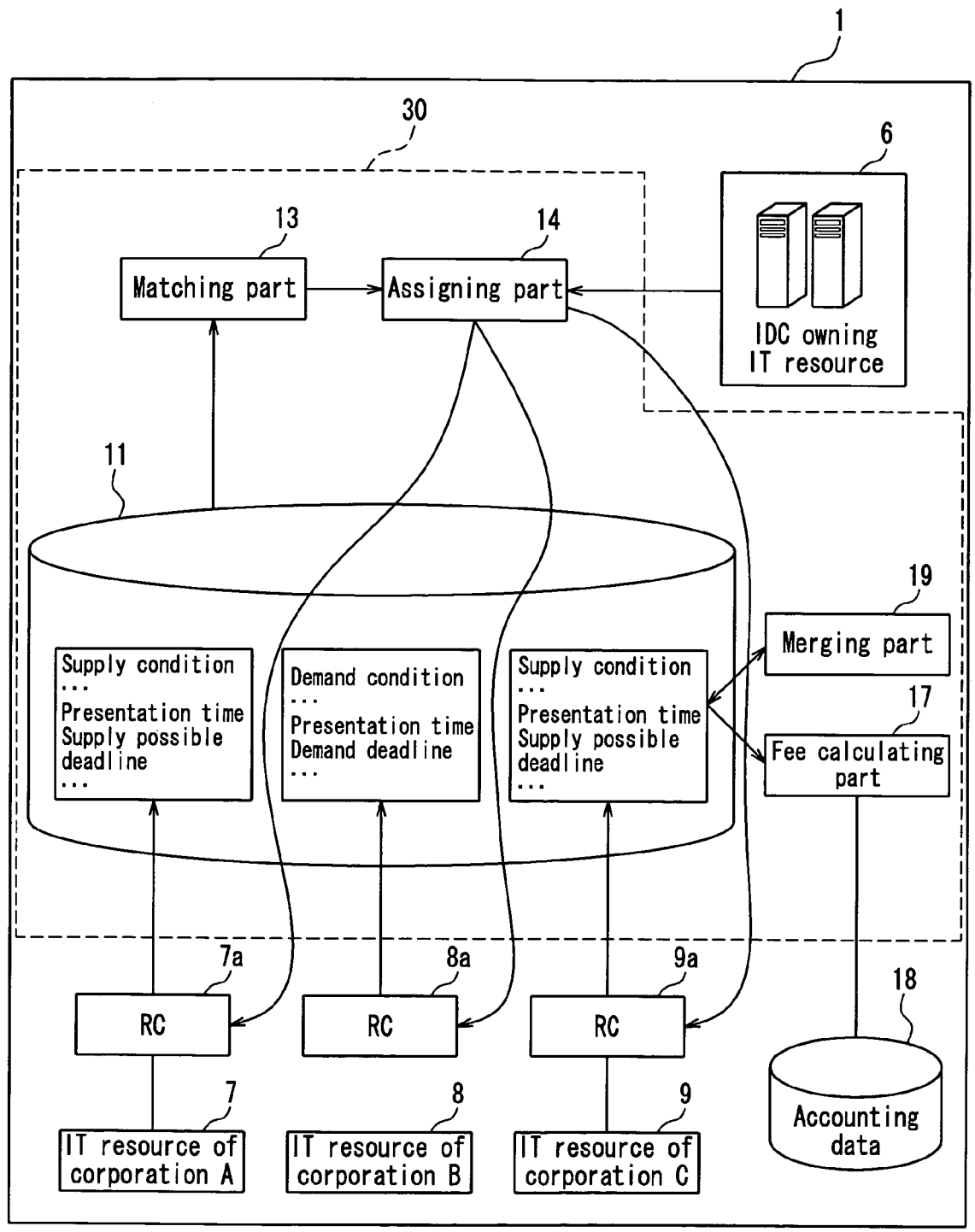
FIG. 17 is a functional block diagram showing a configuration of an IDC including an IT resource management system.
Figure 18:
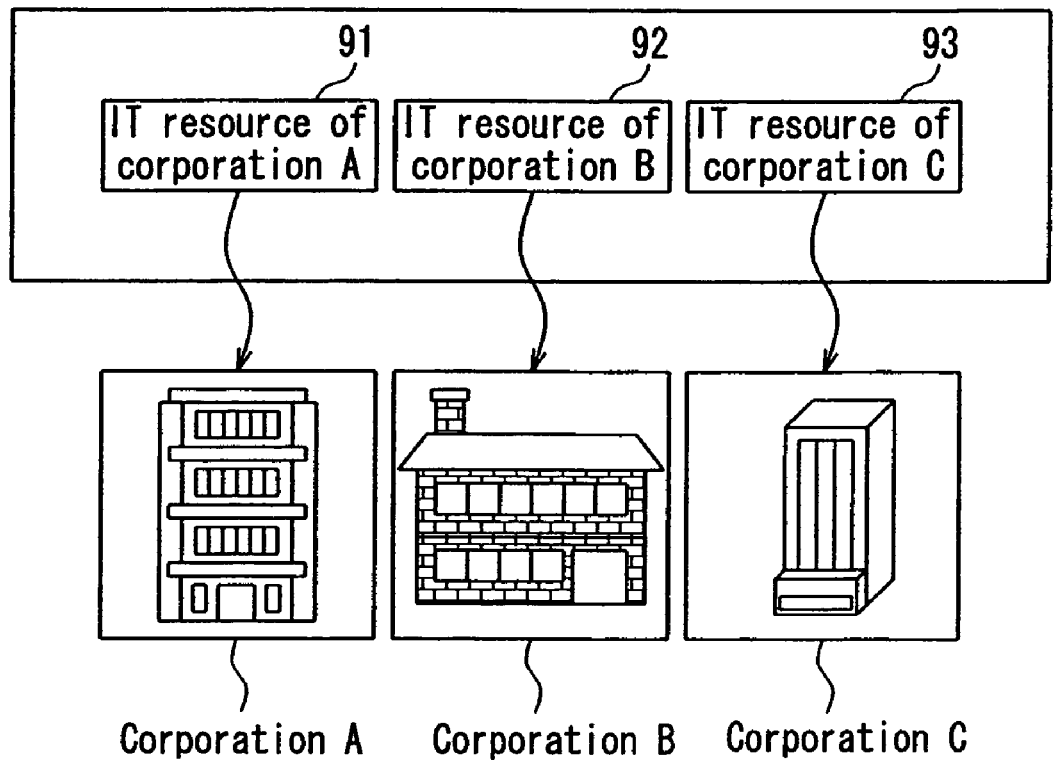
FIG. 18 is a schematic view showing a system configuration of a general IDS.
Figure 19:
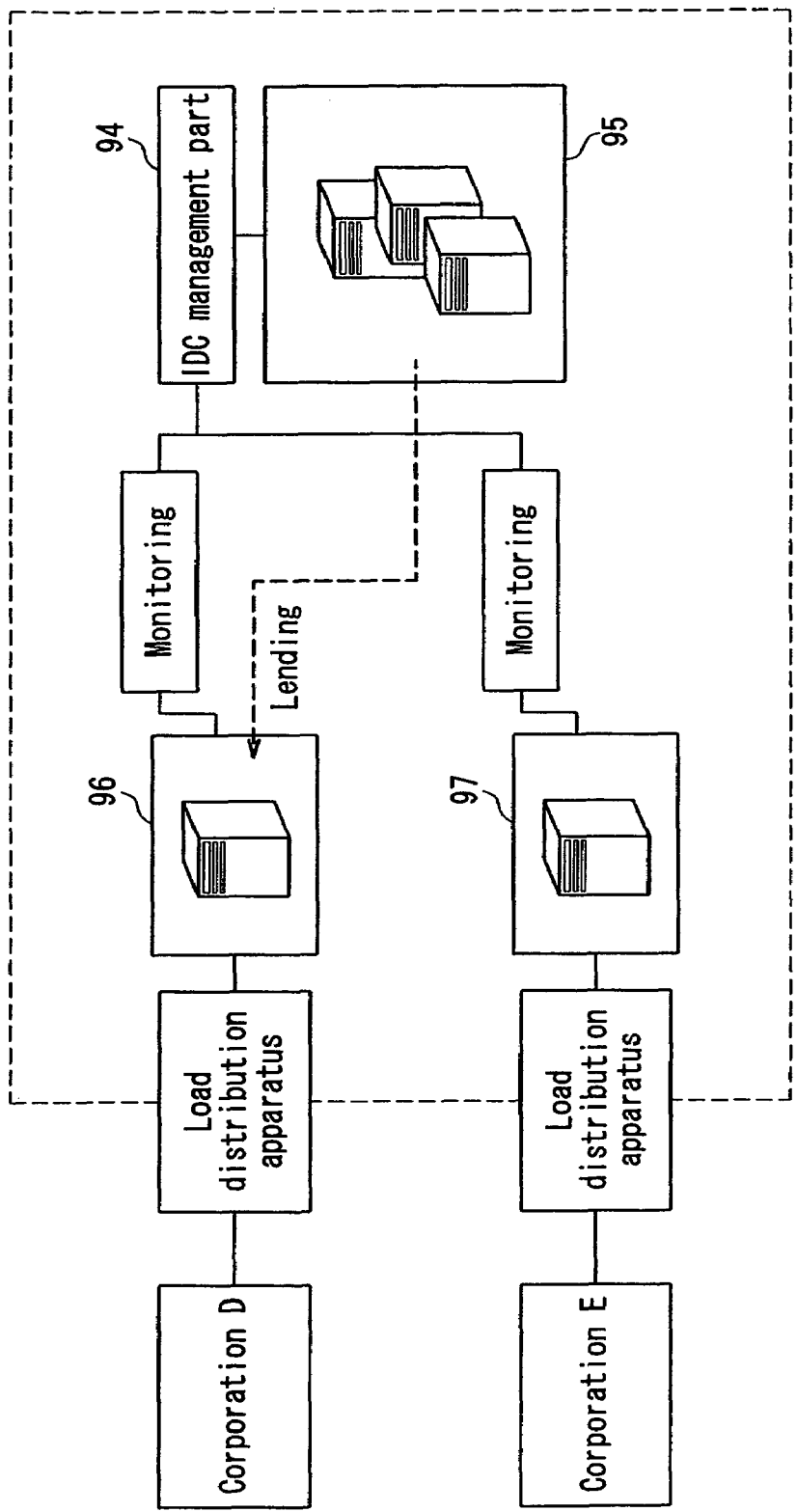
FIG. 19 is a schematic view showing a system configuration of an IDC of a utility system.

FIG. 17 is a functional block diagram showing a configuration of an IDC 1 including an IT resource management system 30 according to the present embodiment.

The IT resource management system 30 further includes a fee calculating part 17. The fee calculating part 17 calculates a fee incurred when the corporations A, B, and C supply or demand the IT resources 7, 8, and 9 based on the supply conditions and demand conditions accumulated in the accumulating part 11. The calculated fee is stored as billing data 18.

First, an example of a method for calculating a fee incurred for a demand will be described.

The demand conditions accumulated in the accumulating part 11 include a "presentation time" and a "demand deadline". The fee calculating part 17 calculates a demand cost, taking the difference between the presentation time and the demand deadline into consideration. For example, as the difference between the presentation time and the demand deadline is larger, a demand cost is lowered.

As the difference between the presentation time and the demand deadline is larger, the number of chances of merging a plurality of demand conditions increases. Consequently, the occurrence of a division loss is prevented, whereby the efficient use of an IT resource is promoted. Thus, a corporation contributes to the efficient use of an IT resource by presenting demand conditions in advance of a demand deadline. The fee to be paid for demanding an IT resource by the corporation is discounted owing to the contribution to the efficient use of an IT resource, whereby an incentive of early presentation is given to the corporation. The corporation can also be given an incentive in such a manner that the amount of money in accordance with the difference between the presentation time and the demand deadline is paid back.

The IDC 1 may bear a part or an entirety of the capital used for a discount or a payback. The reason for this is as follows. Since the IT resource is used efficiently, the possibility increases in which the IDC owning IT resource 6 to be prepared by the IDC is compressed.

Next, an example of a method for calculating a fee incurred for a supply will be described.

The supply conditions accumulated in the accumulating part 11 include a "presentation time" and a "supply possible deadline". The fee calculating part 17 calculates a supply fee, taking the difference between the presentation time and the supply possible deadline into consideration.

As the difference between the presentation time and the supply possible deadline is larger, a plurality of supply conditions are merged, and the possibility of accommodating larger demand conditions increases. Consequently, a corporation contributes to the efficient use of an IT resource by presenting supply conditions in advance of the supply possible deadline. The supply fee received by the corporation at a time of supplying an IT resource is increased owing to the contribution to the efficient use of an IT resource, whereby the corporation can be given an incentive of early presentation. Furthermore, the corporation may be separately given a fee in accordance with the difference between the presentation time and the supply possible deadline.

In Embodiments 1 to 3, the IT resource management system in the IDC has been described. The present invention is not limited to the IDC, and is applicable to other systems managing IT resources owned by a plurality of operating entities.

The present invention is useful as, for example, an IT resource management system capable of enhancing the use efficiency of an IT resource in an IDC or the like.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An IT resource management system composed of a computer for managing a plurality of IT resources owned by a plurality of operating entities, the computer comprising:
   a supply condition accumulating part for accumulating a supply condition of an IT resource input by an operating entity that desires to supply a surplus IT resource in a recording apparatus;
   a demand condition accumulating part for accumulating a demand condition of an IT resource input by an operating entity that desires to compensate for a shortage of an IT resource in a recording apparatus;
   a matching part for extracting a set of a supply condition and a demand condition matched with each other from the supply conditions accumulated in the supply condition accumulating part and the demand conditions accumulated in the demand condition accumulating part; and
   an assigning part for allowing an IT resource under the supply condition of the set to be available for the operating entity under the demand condition of the set,
   wherein
   the supply condition and the demand condition respectively include information representing a business policy defining a business requirement of the operating entity and a service policy defining a system performance requirement and/or an operation rule of an IT resource operated by the operating entity,
   the matching part extracts a set of a supply condition and a demand condition wherein the business policy of the supply condition matches the business policy of the demand condition and the service policy of the supply condition matches the service policy of the demand condition,
   wherein in a case where the IT resource under the supply condition of the set is sufficient to generate a surplus for the demand condition of the set, the assigning part purchases the surplus from the operating entity under the supply condition,
   wherein the supply condition and the demand condition include a business policy and a service policy, wherein the business policy contains at least either one of price information and constraint information in business, wherein the service policy contains at least either one of time information containing a use time or a supply time, and IT resource information for specifying the amount of an IT resource that can be supplied or an IT resource desired to be demanded, and wherein a matching processing part compares the respective items of the business policy and the service policy contained in the supply condition and the demand condition, and extracts a combination of the supply condition and the demand condition which are matched.

2. The IT resource management system according to claim 1, wherein the assigning part adds a previously prepared IT resource to an IT resource under the demand condition of the set, in a case where the IT resource under the supply condition of the set is insufficient for the demand condition of the set.

3. The IT resource management system according to claim 1, further comprising a demand condition merging part for integrating a plurality of demand conditions whose business policies are the same, and accumulating the integrated demand conditions in the demand condition accumulating part as a virtual demand condition.

4. The IT resource management system according to claim 1, further comprising a supply condition merging part for integrating a plurality of supply conditions whose business policies are the same, and accumulating the integrated supply conditions in the supply condition accumulating part as a virtual supply condition.

5. The IT resource management system according to claim 1, wherein the demand condition includes presentation time information representing a time when the demand condition have been presented, and demand deadline information representing a demand deadline, the IT resource management system further comprising a demand fee calculating part for calculating a demand fee regarding a demand by the operating entity that has presented the demand condition, based on a time difference between the presentation time information and the demand deadline information.

6. The IT resource management system according to claim 1, wherein the supply condition includes presentation time information representing a time when the supply condition has been presented, and supply deadline information representing a supply possible deadline, the IT resource management system further comprising a supply fee calculating part for calculating a supply fee regarding a supply by the operating entity that has presented the supply condition, based on a time difference between the presentation time information and the supply deadline information.

7. An IT resource management method for managing a plurality of IT resources owned by a plurality of operating entities by a computer, in a configuration in which the computer is capable of accessing a recording apparatus storing a supply condition of an IT resource input by an operating entity that desires to supply a surplus IT resource, and a demand condition of an IT resource input by an operating entity that desires to compensate for a shortage of an IT resource, the method comprising:

a matching operation for the computer to extract a set of a supply condition and a demand condition matched with each other from the supply conditions and the demand conditions stored in the recording apparatus;

and an assigning operation for the computer to change a setting of an IT resource under the supply condition of the set, in such a manner that the IT resource under the supply condition of the set is available for the operating entity under the demand condition of the set, wherein the supply condition and the demand condition respectively include information representing a business policy defining a business requirement of the operating entity and a service policy defining a system performance requirement and/or an operation rule of an IT resource operated by the operating entity, the matching operation extracts a set of a supply condition and a demand condition wherein the business policy of the supply condition matches the business policy of the demand condition and the service policy of the supply condition matches the service policy of the demand condition, wherein in a case where the IT resource under the supply condition of the set is sufficient to generate a surplus for the demand condition of the set, the assigning part purchases the surplus from the operating entity under the supply condition, wherein the supply condition and the demand condition include a business policy and a service policy, wherein the business policy contains at least either one of price information and constraint information in business, wherein the service policy contains at least either one of time information containing a use time or a supply time, and IT resource information for specifying the amount of an IT resource that can be supplied or an IT resource desired to be demanded, and wherein a matching processing part compares the respective items of the business policy and the service policy contained in the supply condition and the demand condition, and extracts a combination of the supply condition and the demand condition which are matched.

8. An IT resource management method for managing a plurality of IT resources owned by a plurality of operating entities by a computer, comprising:

a supply condition accumulating operation of accumulating a supply condition of an IT resource input by an operating entity that desires to supply a surplus IT resource in a recording apparatus;

a demand condition accumulating operation of accumulating a demand condition of an IT resource input by an operating entity that desires to compensate for a shortage of an IT resource in a recording apparatus;

a matching operation of extracting a set of a supply condition and a demand condition matched with each other from the supply condition and the demand condition; and an assigning operation of changing a setting of an IT resource under the supply condition of the set, in such a manner that an IT resource under the supply condition of the set is available for the operating entity under the demand condition of the set, wherein the supply condition and the demand condition respectively include information representing a business policy defining a business requirement of the operating entity and a service policy defining a system performance requirement and/or an operation rule of an IT resource operated by the operating entity, the matching operation extracts a set of a supply condition and a demand condition wherein the business policy of the supply condition matches the business policy of the demand condition and the service policy of the supply condition matches the service policy of the demand condition, wherein in a case where the IT resource under the supply condition of the set is sufficient to generate a surplus for the demand condition of the set, the assigning part purchases the surplus from the operating entity under the supply condition, wherein the supply condition and the demand condition include a business policy and a service policy, wherein the business policy contains at least either one of price information and constraint information in business, wherein the service policy contains at least either one of time information containing a use time or a supply time, and IT resource information for specifying the amount of an IT resource that can be supplied or an IT resource desired to be demanded, and wherein a matching processing part compares the respective items of the business policy and the service policy contained in the supply condition and the demand condition, and extracts a combination of the supply condition and the demand condition which are matched.

9. A recording medium storing an IT resource management program for allowing a computer to execute processing of managing a plurality of IT resources owned by a plurality of operating entities, the IT resource management program allowing the computer to execute:

matching processing of extracting a set of a supply condition and a demand condition matched with each other from a supply condition of an IT resource input by an operating entity that desires to supply a surplus IT resource and a demand condition of an IT resource input by an operating entity that desires to compensate for a shortage of an IT resource; and assigning processing of allowing an IT resource under the supply condition of the set to be available for the operating entity under the demand condition of the set, wherein the supply condition and the demand condition respectively include information representing a business policy defining a business requirement of the operating entity and a service policy defining a system performance requirement and/or an operation rule of an IT resource operated by the operating entity, the matching processing extracts a set of a supply condition and a demand condition wherein the business policy of the supply condition matches the business policy of the demand condition and the service policy of the supply condition matches the service policy of the demand condition, wherein in a case where the IT resource under the supply condition of the set is sufficient to generate a surplus for the demand condition of the set, the assigning part purchases the surplus from the operating entity under the supply condition, wherein the supply condition and the demand condition include a business policy and a service policy, wherein the business policy contains at least either one of price information and constraint information in business, wherein the service policy contains at least either one of time information containing a use time or a supply time, and IT resource information for specifying the amount of an IT resource that can be supplied or an IT resource desired to be demanded, wherein a matching processing part compares the respective items of the business policy and the service policy contained in the supply condition and the demand condition, and extracts a combination of the supply condition and the demand condition which are matched.

* * * * *